US012787998B2

(12) United States Patent
Beson

(10) Patent No.: US 12,787,998 B2
(45) Date of Patent: Nov. 10, 2026

(54) FISHING ROD HOLDING SYSTEM

(71) Applicant: Beson Enterprises LLC, San Clemente, CA (US)

(72) Inventor: Edward Beson, San Clemente, CA (US)

(73) Assignee: Beson Enterprises LLC, San Clemente, CA (US)

( * ) Notice: Subject to any disclaimer, the term of this patent is extended or adjusted under 35 U.S.C. 154(b) by 0 days.

(21) Appl. No.: 19/069,948

(22) Filed: Mar. 4, 2025

(65) Prior Publication Data

US 2025/0280813 A1 Sep. 11, 2025

Related U.S. Application Data

(60) Provisional application No. 63/562,139, filed on Mar. 6, 2024.

(51) Int. Cl.
*A01K 97/10* (2006.01)

(52) U.S. Cl.
CPC .................................... *A01K 97/10* (2013.01)

(58) Field of Classification Search
CPC ...................................................... A01K 97/10
See application file for complete search history.

(56) References Cited

U.S. PATENT DOCUMENTS 2,199,034 A * 4/1940 Witczak ................. A01K 97/10 248/514
2,478,176 A * 8/1949 Belk ...................... A01K 97/10 248/517
4,676,019 A * 6/1987 Engles ................... A01K 97/10 43/21.2
5,438,789 A * 8/1995 Emory ................... A01K 97/10 248/514
6,591,541 B1 * 7/2003 Cummings ............ A01K 97/10 248/514

(Continued)

FOREIGN PATENT DOCUMENTS

AU 2016213731 A1 3/2017
CN 215270155 U 12/2021

(Continued)

OTHER PUBLICATIONS

Dual-axis Adjustable Rod Holder, retrieved online on Oct. 20, 2023, at: https://www.amazon.com/Berts-Custom-Tackle-Single-12-Inch/dp/B003SOP77K/ (2023).

(Continued)

*Primary Examiner* — Christopher D Hutchens
(74) *Attorney, Agent, or Firm* — Knobbe, Martens, Olson & Bear, LLP

(57) ABSTRACT

A system may include a base plate. The system may include a plurality of rails attached to the base plate, each of the plurality of rails comprising a plurality of connection points. The system may include at least one rod holder configured to be rotatably coupled to at least one of the plurality of rails at a first connection point. The system may include at least one pivot arm rotatably coupled to the at least one rod holder, the at least one pivot arm configured to be coupled to at least one of the plurality of rails at a second connection point.

18 Claims, 20 Drawing Sheets

(56) References Cited

U.S. PATENT DOCUMENTS

| | | | | |
|---|---|---|---|---|
| 6,974,113 | B1 * | 12/2005 | Clark | A01K 97/10 248/521 |
| 2003/0089021 | A1 * | 5/2003 | Miller | A01K 97/10 43/21.2 |
| 2015/0366180 | A1 | 12/2015 | Chmura | |
| 2016/0045024 | A1 | 2/2016 | Roberts et al. | |
| 2018/0153150 | A1 | 6/2018 | Arrazola et al. | |
| 2020/0307464 | A1 | 10/2020 | Mcfadden et al. | |
| 2021/0400941 | A1 | 12/2021 | Anderson | |
| 2022/0295773 | A1 | 9/2022 | Taylor | |
| 2022/0314894 | A1 | 10/2022 | Viklund et al. | |
| 2025/0017189 | A1 * | 1/2025 | Wallace | A01K 97/10 |

FOREIGN PATENT DOCUMENTS

| | | | |
|---|---|---|---|
| JP | 3130303 | U * | 3/2007 |
| KR | 20-1991-0007625 | Y1 | 9/1991 |

OTHER PUBLICATIONS

Tackle Track, retrieved online on Oct. 20, 2023, at: https://cannon.johnsonoutdoors.com/us/learn/buying-guides/rod-holders (2023).

Viking Solutions—Viking Truck Bed/Wall-Mount Rod Rack, retrieved online on Feb. 28, 2024, at: https://www.vikingsl.com/viking-truck-bed-wall-mount-rod-rack/ (2024).

International Search Report for PCT/US2025/018329 dated Jul. 2, 2025.

* cited by examiner

FISHING ROD HOLDING SYSTEM

PRIORITY, CROSS-REFERENCE, AND INCORPORATION

This application claims priority to U.S. Provisional Patent Application No. 63/562,139 filed Mar. 6, 2024. The entire contents of the above are hereby incorporated into this document by reference and made a part of this specification for all purposes, for all that it contains. Moreover, any and all applications for which a foreign or domestic priority claim is identified in the Application Data Sheet of the present application are hereby incorporated by reference under 37 C.F.R. § 1.57.

BACKGROUND

Fishing is a popular recreational and commercial activity that is enjoyed throughout the world. There are many types of fishing rods available depending on the type of fishing a consumer might want to enjoy including spinning rods, casting rods, trolling rods, surf rods, fly fishing rods, and ice rods. Furthermore, the length of the fishing rod can affect the casting accuracy, the distance of casting, and the leverage of the rod. These factors often lead to consumers engaging in fishing to bring multiple poles or rods to a fishing outing or activity. However, transporting multiple fishing rods can be troublesome. Fishing rods are often long and fragile which makes them prone to snapping or breaking if not handled carefully. Furthermore, the size and shape of the fishing rods make them cumbersome to carry or to store.

As such, there exists a need for a device capable of storing multiple fishing rods allowing for easy and safe transportation of fishing rods on a boat or vehicle.

SUMMARY

In some aspects, the techniques described herein relate to a fishing rod holding system, including a base plate, a plurality of rails attached to the base plate, each of the plurality of rails including a plurality of connection points, and at least one rod holder configured to be rotatably coupled to at least one of the plurality of rails at a first connection point; and at least one pivot arm rotatably coupled to the at least one rod holder, the at least one pivot arm configured to be coupled to at least one of the plurality of rails at a second connection point.

In some aspects, the techniques described herein relate to a system, wherein the rod holder is configured to be rotated between a first and second angular orientation when attached to the at least one of the plurality of rails.

In some aspects, the techniques described herein relate to a system, wherein the first angular orientation is an orientation that is substantially parallel to the base plate.

In some aspects, the techniques described herein relate to a system, wherein the second angular orientation is an orientation that is substantially normal to the base plate.

In some aspects, the techniques described herein relate to a system, wherein the at least one rod holder is further configured to be detachably coupled to the at least one of the plurality of rails.

In some aspects, the techniques described herein relate to a system, wherein the at least one pivot arm is further configured to secure the at least one rod holder in an angular orientation when the pivot arm is coupled to the at least one of the plurality of rails.

In some aspects, the techniques described herein relate to a system, wherein the base plate is configured to be mounted onto an external surface or object.

In some aspects, the techniques described herein relate to a system, further including a vehicle, wherein the base plate is configured to be secured onto a surface of the vehicle.

In some aspects, the techniques described herein relate to a system, wherein the pivot arm is detachably coupled to the at least one rod holder.

In some aspects, the techniques described herein relate to a system, wherein the at least one rod holder is configured to be coupled to the least one of the plurality of rails at the first connection point by inserting a mechanical connector through a rail connection point of the rod holder and the first connection point.

In some aspects, the techniques described herein relate to a system, wherein the mechanical connectors may include, for example, a screw, a bolt and nut, or a pin.

In some aspects, the techniques described herein relate to a method for storing fishing rods or other items including providing a fishing rod holding system including: a base plate; a plurality of rails attached to the base plate, each of the plurality of rails including a plurality of connection points; and at least one rod holder configured to be rotatably coupled to at least one of the plurality of rails at a first connection point; and at least one pivot arm rotatably attached to the at least one rod holder, the at least one pivot arm configured to be coupled to at least one of the plurality of rails at a second connection point; and coupling the at least one rod holder to the at least one of the plurality of rails at the first connection point; coupling the pivot arm to the at least one of the plurality of rails at a second connection point; and engaging a fishing rod with the at least one rod holder, thereby securing the fishing rod to the fishing rod holding system.

In some aspects, the techniques described herein relate to a method, further including altering the angular orientation of the least one rod holder.

In some aspects, the techniques described herein relate to a method, wherein altering the angular orientation of the at least one rod holder includes detaching the pivot arm from the at least one of the plurality or rails at the second connection point; and reattaching the pivot arm to the at least one of the plurality of rails at a third connection point.

In some aspects, the techniques described herein relate to a method, wherein altering the angular orientation of the at least one rod holder includes detaching the at least one rod holder from the at least one of the plurality or rails at the first connection point; and reattaching the at least one rod holder to the at least one of the plurality of rails at a third connection point.

In some aspects, the techniques described herein relate to a method, wherein altering the angular orientation of the at least on rod holder includes changing the angular orientation of the at least one rod holder between 0° degrees and 90°.

In some aspects, the techniques described herein relate to a method, further including mounting the base plate onto an external surface or object.

In some aspects, the techniques described herein relate to a method, further including securing the base plate to a surface of a vehicle.

In some aspects, the techniques described herein relate to a method, wherein coupling the at least one rod holder to the least one of the plurality of rails at the first connection point, includes aligning the first connection point with a rail connection point of the rod holder; and inserting a mechanical connector through the first connection point and the rail connection point.

In some aspects, the techniques described herein relate to a method, wherein the mechanical connector includes a screw, a bolt and nut, or a pin.

BRIEF DESCRIPTION OF THE DRAWINGS

The detailed description is set forth with reference to the accompanying figures. The use of the same numbers in different figures indicates similar or identical items.

For this discussion, the devices and systems illustrated in the figures are shown having a multiplicity of components. Various implementations of devices and/or systems, as described herein, may include fewer components, and remain within the scope of the disclosure. Alternatively, other implementations of devices and/or systems may include additional components, or various combinations of the described components, and remain within the scope of the disclosure.

DETAILED DESCRIPTION

Figure 1:
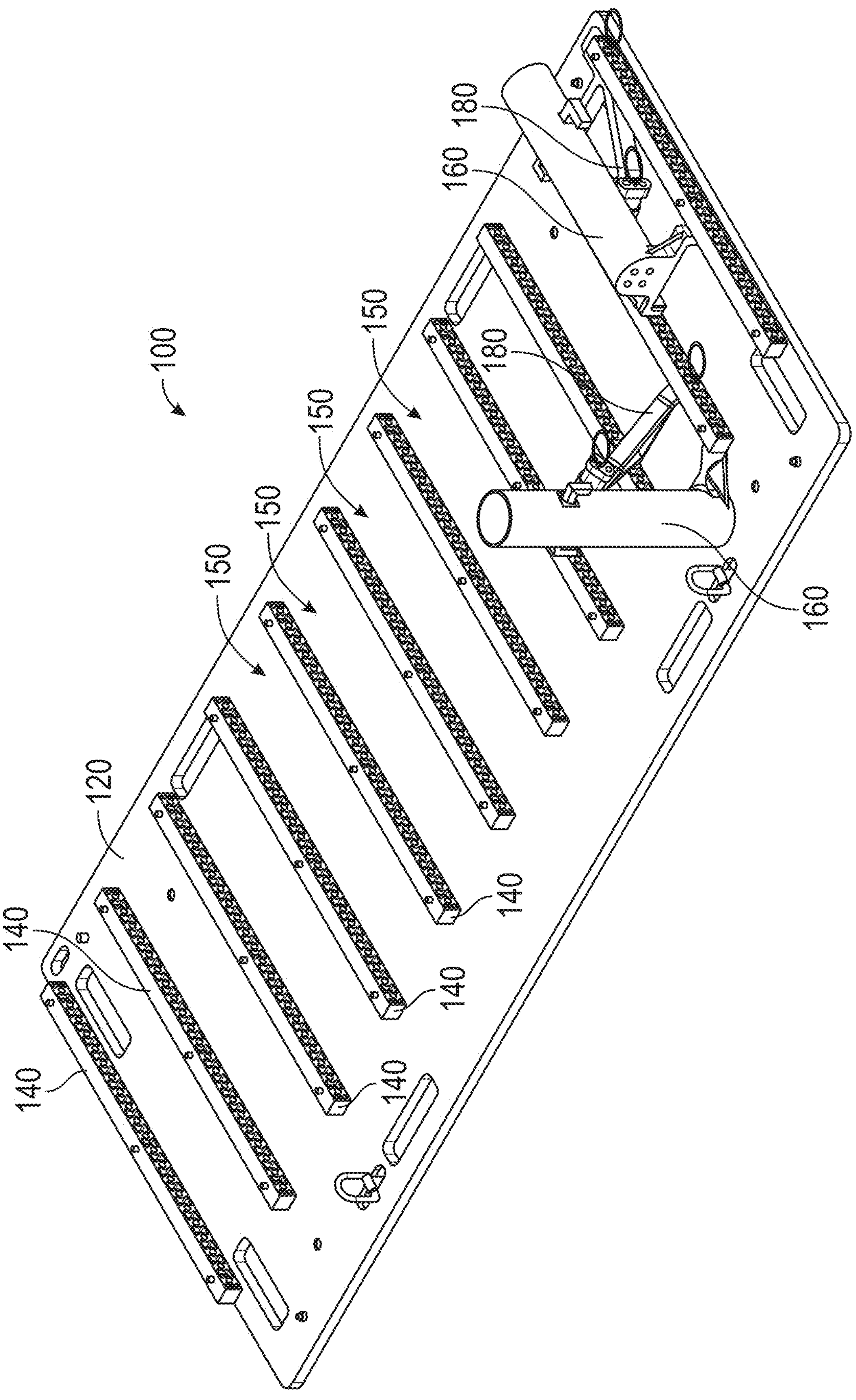
FIG. 1 shows an isometric view of a fishing rod holding system.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Furthermore, embodiments of the development may include several novel features, no single one of which is solely responsible for its desirable attributes or which is essential to practicing any particular embodiment described herein.

FIG. 1 shows an isometric view of a fishing rod holding system 100. As seen in FIG. 1, the system 100 includes a base plate 120, a plurality of rails 140, a plurality of rod holders 160, and a plurality of pivot arms 180. The rails 140 are configured to be secured to the base plate 120 to create a plurality of connection channels 150 between adjacent rails 140. The pivot arms 180 and rod holders 160 are configured to be secured to the rails 140 with the connection channels 150 in a variety of configurations as described herein.

Figure 2A:
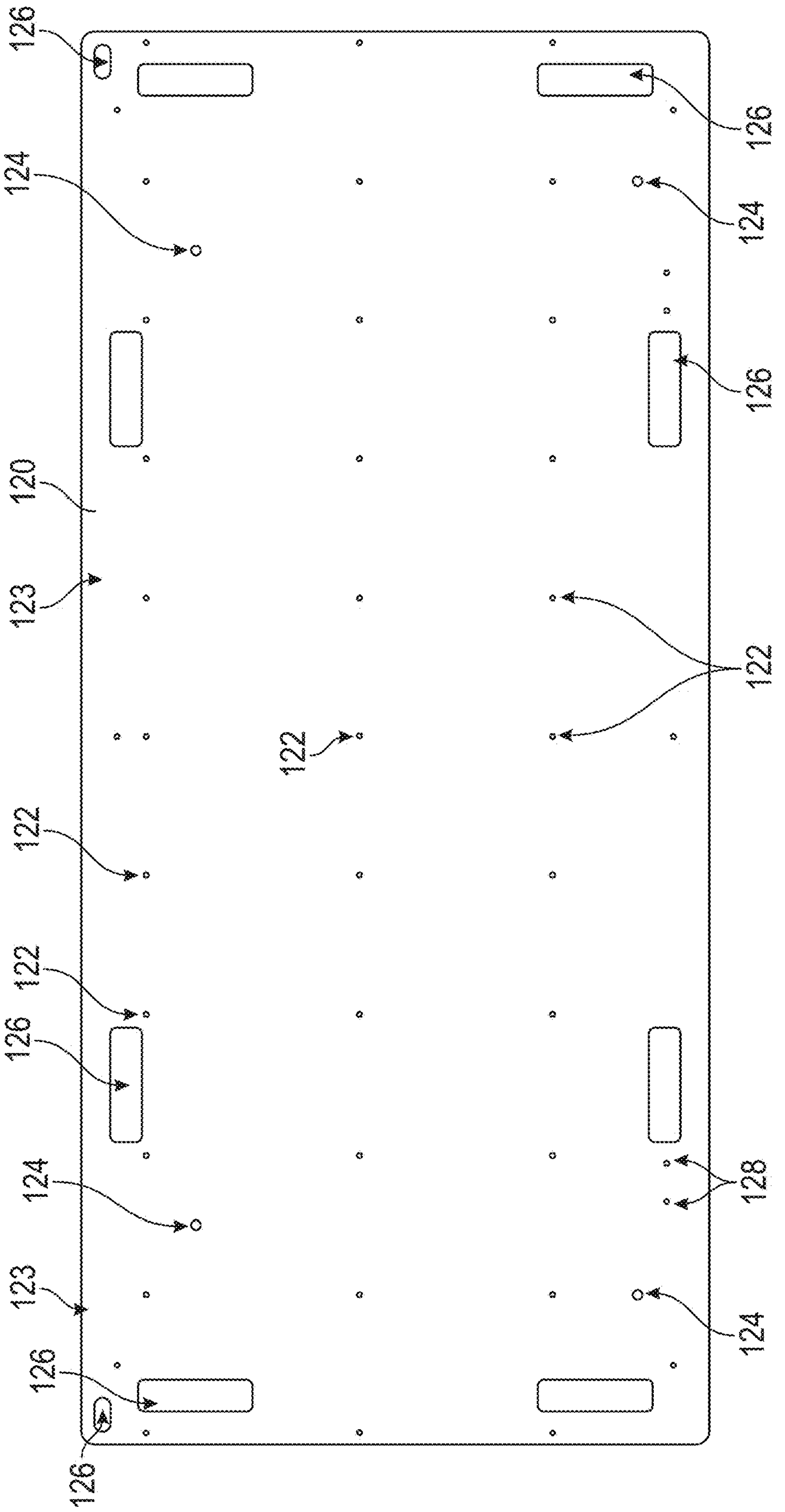
FIG. 2A shows a front view of a base plate.

FIG. 2A shows a front view of a base plate 120. As seen in FIG. 2A, the base plate 120 may include a plurality of connection points, such as a plurality of rail connection points 122, a plurality of large connection points 124, and a plurality of mounting connection points 128. In some embodiments, the base plate 120 includes a plurality of slots 126.

The base plate 120 may be substantially rectangular in shape. In some embodiments, the base plate may take a different shape including but not limited to a circular shape, an oval shape, a square shape, a hexagon shape, or any other polygon shape.

In some embodiments, the base plate 120 is formed from any suitable material, such as a polymer or plastic material, (e.g., polyethylene, high density polyethylene, low density polyethylene, polypropylene, polyvinyl chloride, polycarbonate, resin etc.), a metal material or alloy (e.g., stainless steel, titanium, aluminum, iron, copper, brass, bronze, lead, nickel, etc.) or a composite material (e.g., fiber glass, carbon fiber, etc.). In some embodiments, the base plate 120 is formed of polyethylene. In some embodiments, the base plate 120 is formed of high density polyethylene. In some embodiments, the base plate 120 is formed via injection molding.

The plurality of rail connection points 122 are disposed on a front surface of the base plate 120. In some embodiments, the rail connection points 122 may consist of a hole, such as, but not limited to, a round hole, a countersunk hole, a counterbore hole, a through hole, a blind hole a tapered hole, a keyhole slot, a dowel hole, or a helical hole. In some embodiments, the rail connection points penetrate from one side of the base plate 120 to emerge on an opposite side of the base plate 120. In some embodiments, the rail connection points 122 do not penetrate completely through the base plate 120.

In some embodiments, the plurality of rail connection points 122 are disposed on the front surface of the base plate 120 in a plurality of columns 123. In some embodiments, a column of rail connection points 123 may be used to assist in securing a rail 140 to the base plate 120. In some embodiments, a column of rail connection points 123 may include 1, 2, 3, 4, or 5 rail connections points 122. In some embodiments, more than 5 rail connections points 122 may be included in a column 123.

In some embodiments, the plurality of large connection points 124 is disposed on the front surface of the base plate 120. The plurality of large connection points 124 may consist of holes that penetrate the through the base plate 120. In some embodiments, each of the large connection points 124 may consist of a hole, such as, but not limited to, a round hole, a countersunk hole, a counterbore hole, a through hole, a blind hole a tapered hole, a keyhole slot, a dowel hole, or a helical hole. In some embodiments, the large connection points 124 do not penetrate completely through the base plate 120. The large connection points 124 may serve to secure the base plate 120 to an external surface or object, such as a wall, a vehicle, such as a truck or boat, or other area where a user may desire to mount or secure the base plate 120. In some embodiments, a vehicle may include an automobile, such as a car, truck, bus, van, SUV, etc., a motorcycle, an off road vehicle, such as an ATV, a scooter, a bicycle, a train, a ship, a boat, such as commercial fishing boats, a bass boat, a skiff, a drift boat, a Jon boat, a yacht, or other types of watercraft, or a personal watercraft, such as jet skis, etc.

In some embodiments, the base plate 120 is secured to an external object or surface by aligning the large connection points 124 with an external surface or object and securing the base plate 120 by means of a mechanical connector disposed through the large connection point 124 and the corresponding feature of the external surface or object. In some embodiments, an external feature such as the telescoping arm, cart feature, and t-track feature as described below are secured to the base plate 120 by aligning at least one large connection points 124 with a corresponding feature on the external feature and securing the external feature to the base plate 120 by means of a mechanical connector disposed through the large connection point 124 and the corresponding feature of the external feature. In some embodiments, mechanical connectors may include, but are not limited to, bolts and nuts, dowels, screws, clips, clamps, fasteners, pins, or keys. In some embodiments, the mechanical connector may be inserted or threaded through a large connection point 124 and through a corresponding hole or connection point of an external object or surface or external feature or through the external object or surface or external feature itself, thereby securing the base plate to the external surface or object or external feature. In some embodiments, the large connection points 124 may serve to connect an external feature to the base plate 120.

The plurality of slots 126 may each be largely rectangular in shape and disposed along an outer perimeter of the base plate 120. In some embodiments, the base plate 120 may have slots 126 of different sizes and shapes. In some embodiments, the slots 126 may take a different shape including but not limited to a circular shape, an oval shape, a square shape, a hexagon shape, or any other polygon shape. In some embodiments, the slots 126 serve to hang or secure the base plate on an external object or surface. In some embodiments, the slots 126 allow the base plate to be hung on external hooks or knobs or other object. In some embodiments, the slots 126 serve as handholds for a user, thereby allowing a user to easily carry the base plate 120.

In some embodiments, the base plate 120 also includes a plurality of mounting points 128. In some embodiments, the plurality of mounting points 128 may be disposed adjacent to at least a portion of the slots 126. In some embodiments, the mounting points 128 may consist of a hole, such as, but not limited to, a round hole, a countersunk hole, a counterbore hole, a through hole, a blind hole a tapered hole, a keyhole slot, a dowel hole, or a helical hole. In some embodiments, the mounting points 128 may serve to attach a hook, a loop or other mechanical device. The hook, loop, D-ring, or other mechanical device may serve as an additional means for mounting or hanging the base plate 120. In some embodiments, the large mounting points 128 may serve to secure an external feature such as the telescoping arm, cart feature, and t-track feature as described below to the base plate 120. In some embodiments, an external feature such as the telescoping arm, cart feature, and t-track feature as described below are secured to the base plate 120 by aligning at least one mounting point 128 with a corresponding feature on the external feature and securing the external feature to the base plate 120 by means of a mechanical connector being disposed through the mounting point 128 and the corresponding feature of the external feature.

Figure 2B:
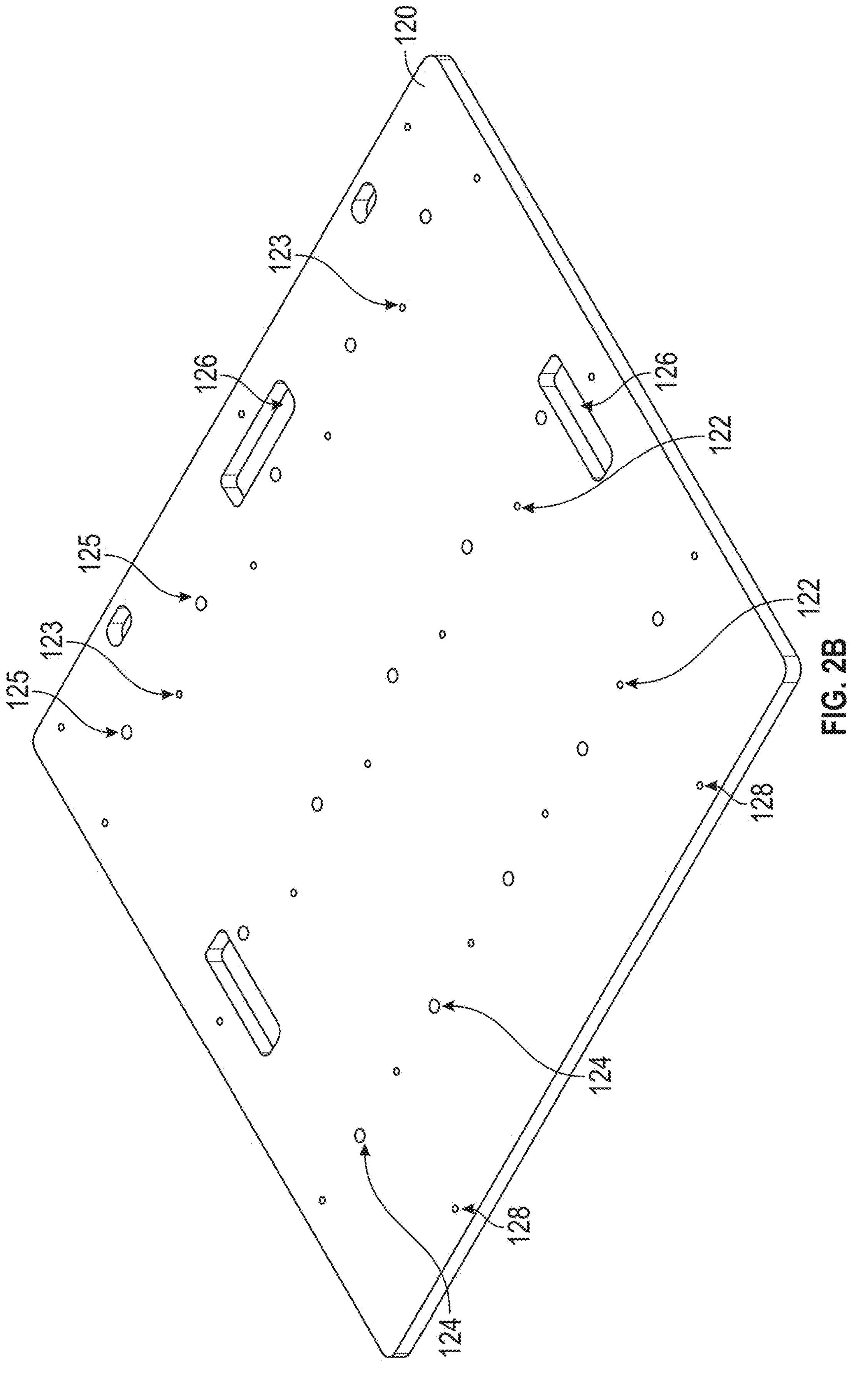
FIG. 2B shows an isometric view of a base plate.

FIG. 2B shows an isometric view of a base plate 120. As seen in FIG. 2B, the base plate 2B may vary in size. Additionally, as seen in FIG. 2B, the plurality of large connection points 124 may be disposed on the base plate 120 in a plurality of columns 125. Each column of large connection points 125 may be disposed between adjacent columns of rail connection points 123. This configuration beneficially allows for greater flexibility and choice by a user when attaching external features to the base plate 120.

Figure 2C:
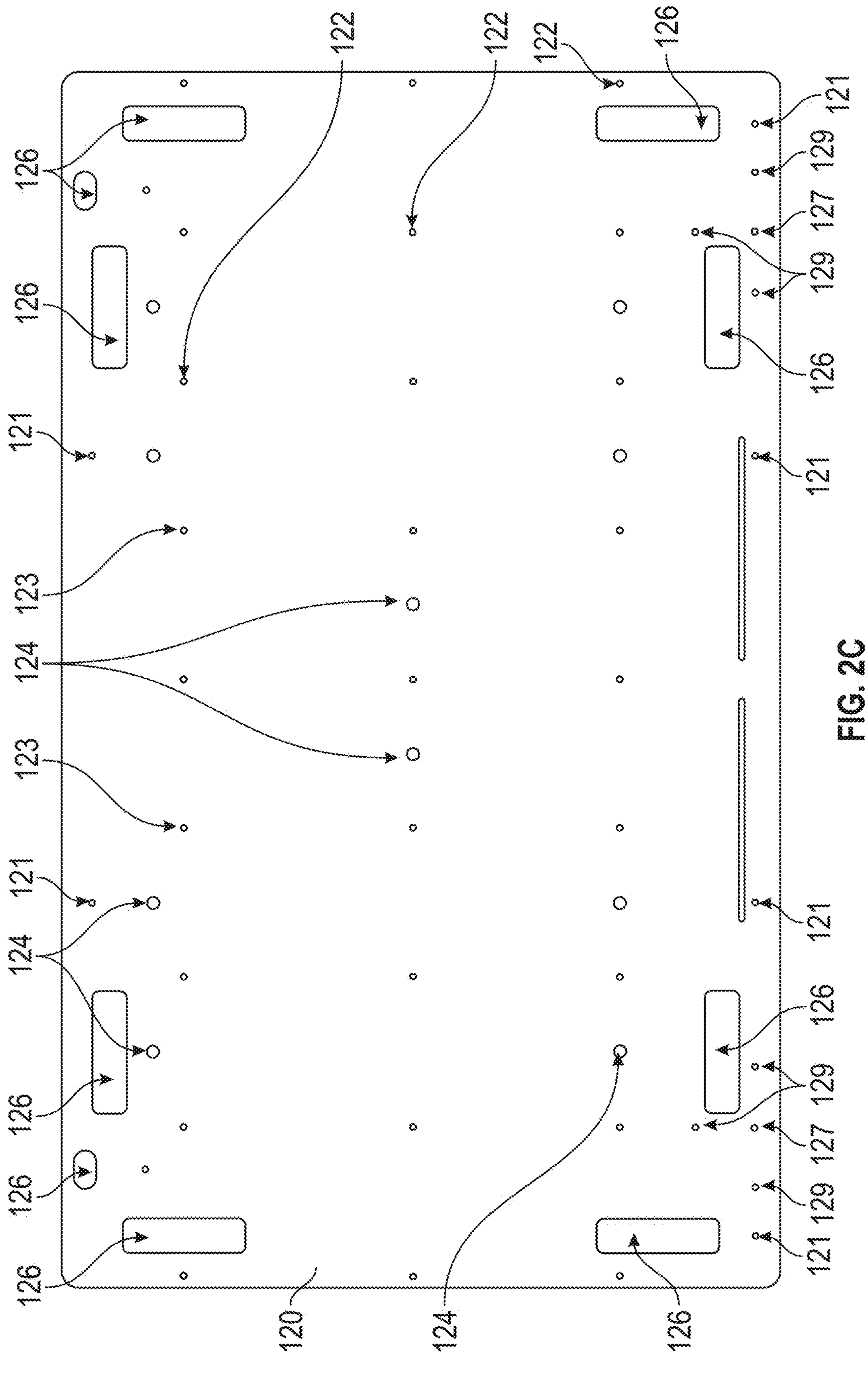
FIG. 2C shows a front view of a base plate.

FIG. 2C shows a front view of the base plate 120. As seen in FIG. 2C, in some embodiments, the base plate 120 may include friction points 121. The friction points 121 may be disposed on a perimeter of the base plate 120 and be configured to receive a friction device such as rubber feet or other similar device. The friction device may be disposed on an underside of the base plate 120 such that the friction device contacts the surface the base plate 120 is disposed on. In some embodiments, the friction points may consist of a hole, such as, but not limited to, a round hole, a countersunk hole, a counterbore hole, a through hole, a blind hole a tapered hole, a keyhole slot, a dowel hole, or a helical hole.

Additionally, as seen in FIG. 2C, the base plate 120 may also include at least one first arm connection point 127 and at least one second connection point 129. In some embodiments, the first arm connection points 127 may be disposed near or on the perimeter of the base plate 120 and be configured to assist in securing a telescoping arm (such as the telescoping arm 300 described below). The at least one second connection point 129 may be disposed around the at least one arm connection point 127. In some embodiments, each first arm connection point 127 may be surrounded by three second arm connection points 129. In some embodiments, the second arm connections points 129 may be disposed at 90-degree intervals around the first arm connection point 127. Thereby allowing greater flexibility for securing the telescoping arm 300 to the base plate 120.

Figure 3A:
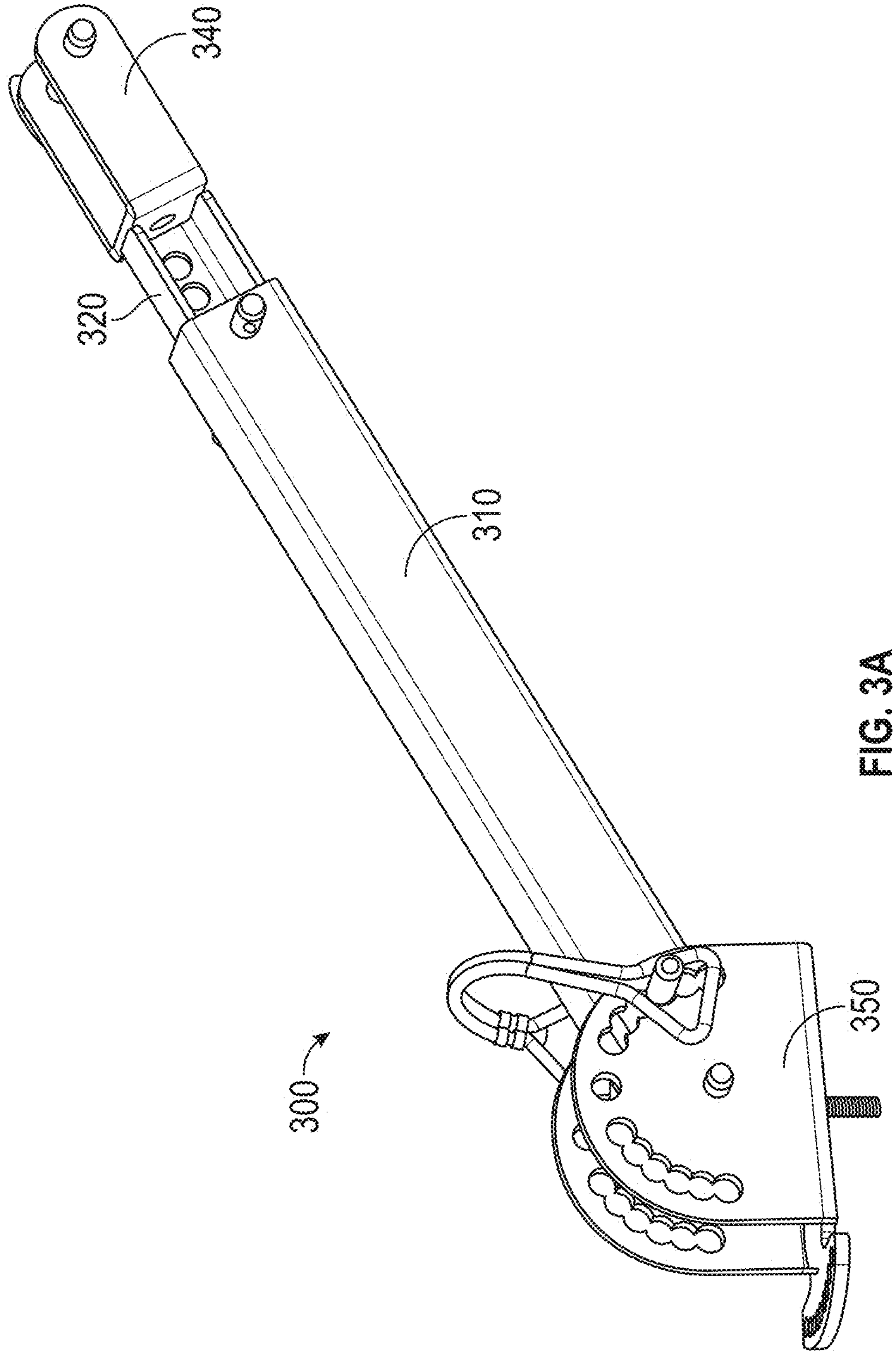
FIG. 3A shows a side isometric view of a telescoping arm.

In some embodiments, at least one telescoping arm 300 may be attached to the base plate 120 at or near the location of the plurality of mounting points 128. In some embodiments, the at least one telescoping arm is connected to base plate via at least one large connection points 124. FIG. 3A shows an isometric view of a telescoping arm 300. As seen in FIG. 3A, the telescoping arm 300 may have an outer body 310, an inner body 320, a base connector 350 and an external connector 340.

Figure 3B:
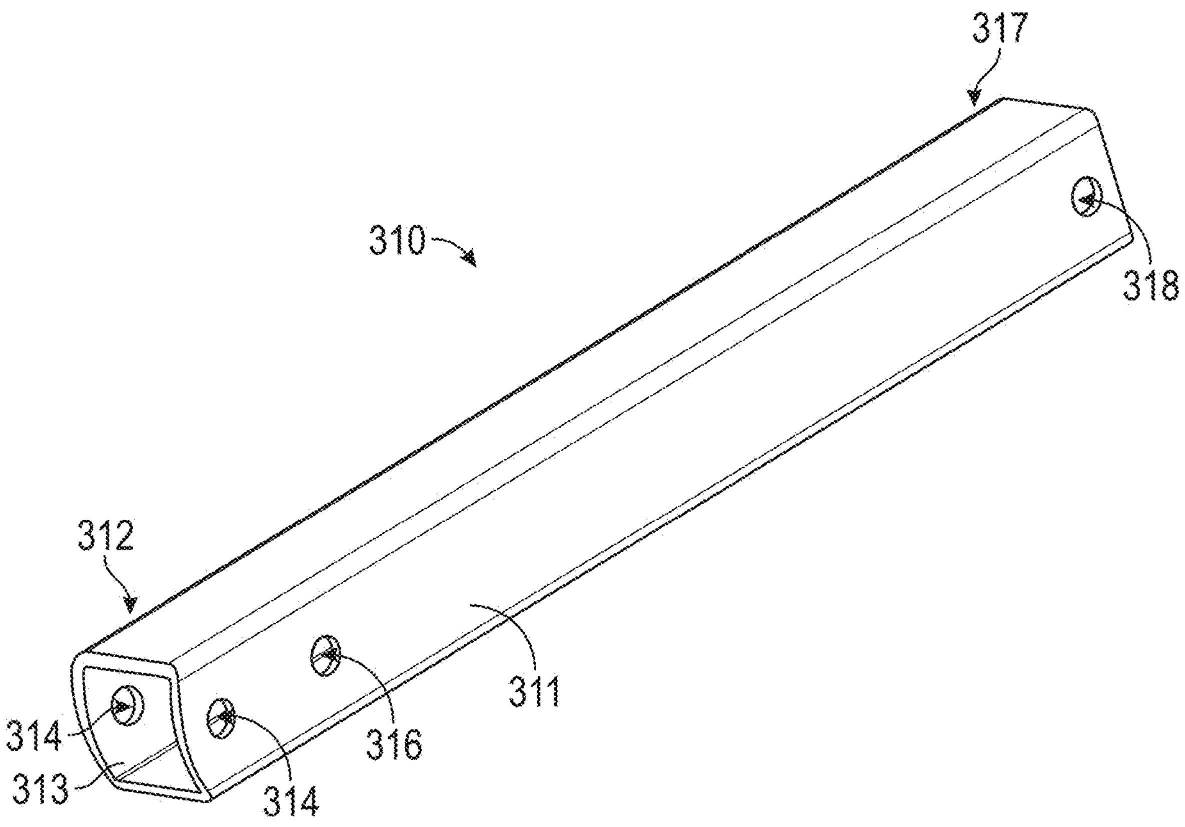
FIG. 3B shows a side isometric view of an outer body of the telescoping arm

FIG. 3B shows an isometric view of the outer body 310. The outer body 310 may be substantially cylindrical in shape with a hollow center. In some embodiments, the outer body 310 have a cross-section that is substantially square or rectangular in shape with a hollow center. At a first end 312 of the outer body 310, the outer body 310 may include at least one lower connection point 314 and at least one upper connection point 316. In some embodiments, the outer body 310 may be rounded at the first end 312. In some embodiments, there are two lower connection points 314 and two upper connection points 316, a lower connection point 314 and an upper connection point 316 disposed on a first side 311 of the outer body 310 and a lower connection point 314 and an upper connection 316 disposed on a second side 313 of the outer body 310. In some embodiments, the lower connection points 314 are aligned along a length of outer body 310 such that a mechanical connector can be disposed through each lower connection point 314 simultaneously. In some embodiments, the upper connection points 316 are aligned along a length of outer body 310 such that a mechanical connector can be disposed through each upper connection point 316 simultaneously. In some embodiments, each of the lower connection points 314 and the upper connection points 316 may consist of a hole, such as, but not limited to, a round hole, a countersunk hole, a counterbore hole, a through hole, a blind hole, a tapered hole, a keyhole slot, a dowel hole, or a helical hole.

At a second end 317 of the outer body 310, the outer body 310 may be substantially hollow, thereby allowing the inner body 320 to be inserted into the outer body 310 of the telescoping arm 300. In some embodiments, the outer body 310 may be hollow along the entire length of the outer body 310. The second end 317 of the outer body 310, may also include at least one outer extension hole 318. In some embodiments, there are two outer extension points 318, an outer extension point 318 on the first side 311 of the outer body 310 and an outer extension point 318 on the second side 313 of the outer body 310. In some embodiments, the outer extension points 318 are aligned along a length of outer body 310 such that a mechanical connector can be disposed through each outer extension point 318 simultaneously. In some embodiments, each of the outer extension points 318 may consist of a hole, such as, but not limited to, a round hole, a countersunk hole, a counterbore hole, a through hole, a blind hole a tapered hole, a keyhole slot, a dowel hole, or a helical hole.

Figure 3C:
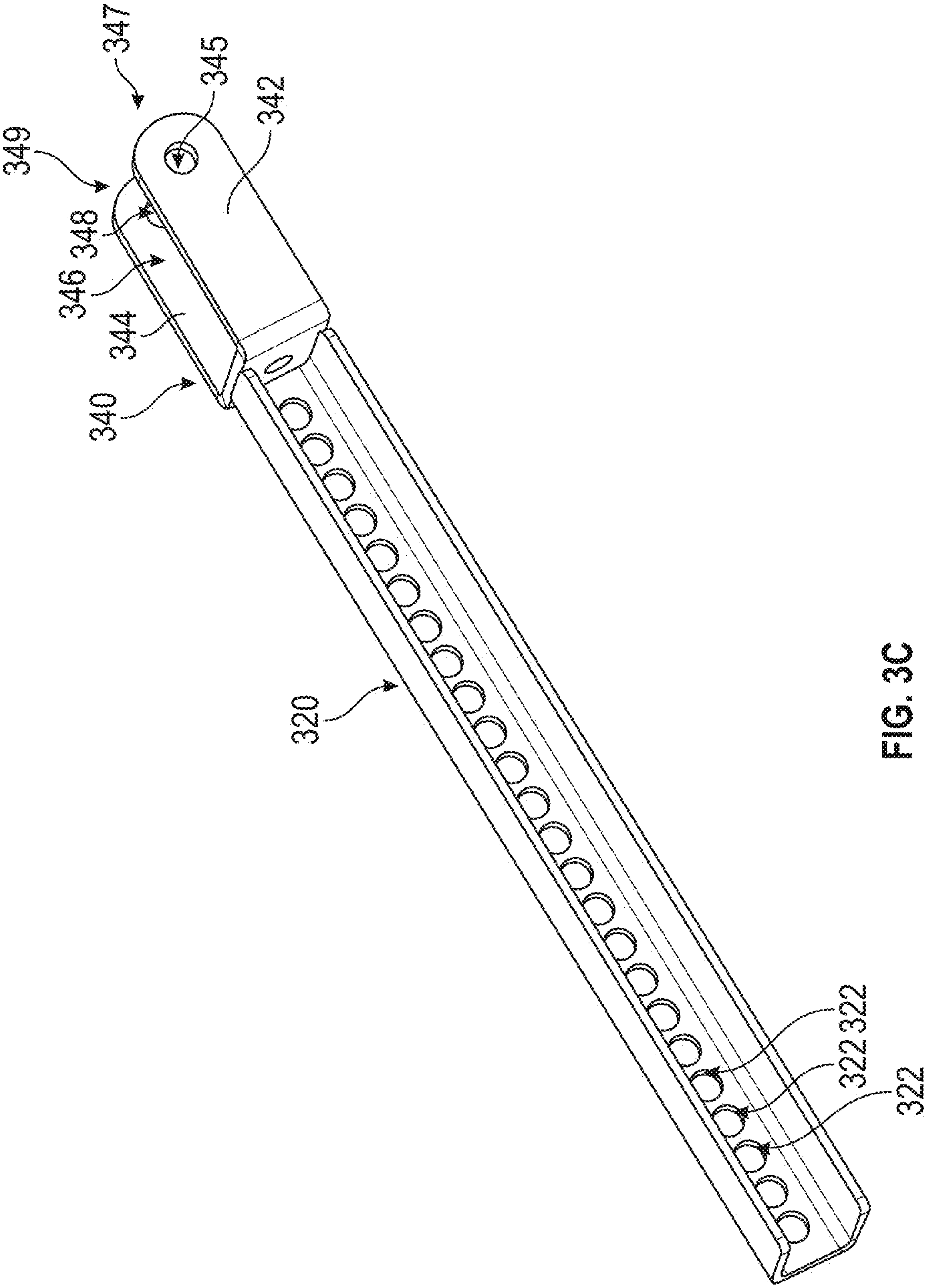
FIG. 3C shows a side isometric view of an inner body of the telescoping arm

FIG. 3C shows an isometric view of the inner body 320 with the external connecter 340. In some embodiments, the inner body 320 may be substantially cylindrical in shape. The inner body 320 may have a diameter that is smaller than the diameter of the outer body 310 such that the inner body 320 can be inserted into the outer body 310. In some embodiments, the inner body 320 may have a cross-section that is substantially square or rectangular in shape. In some embodiments, the cross-section of the inner body 320 may be generally square or rectangular in shape, while missing a side, thereby forming an open rectangle and forming a general C-shape. The cross section of the inner body 320 may be smaller than the cross section of outer body 310 such that the inner body 320 can be inserted into the hollow center of the outer body 310. The inner body 320 includes a plurality of inner extension holes 322. The plurality of inner extension holes 322 may be disposed along the length of the inner body 320. In some embodiments, each inner extension hole 322 may consist of a hole, such as, but not limited to, a round hole, a countersunk hole, a counterbore hole, a through hole, a blind hole, a tapered hole, a keyhole slot, a dowel hole, or a helical hole.

The overall length of the telescoping arm 300 can be varied by inserting the inner body 320 of the telescoping arm 300 into the outer body 310 to a desired depth. The telescoping arm 300 can be set to a desired length by inserting the inner body 320 of the telescoping arm 300 into the outer body 310, aligning an inner extension hole 322 of the inner body 320 with a set of outer extension points 318 of the outer body 310, and securing by means of a mechanical connector being disposed through the aligned inner extension hole 322 of the inner body 320 and outer extension points 318 of the outer body 310. In some embodiments, mechanical connectors may include, but are not limited to, bolts and nuts, dowels, screws, clips, clamps, fasteners, pins, or keys. In some embodiments, the mechanical connector may be disposed or threaded through a set of outer extension points 318 aligned with an inner extension hole 322, thereby securing the inner body 320 within the outer body 310.

The inner body 320 is connected to the external connector 340. In some embodiments, the external connector 340 is integrally formed with the inner body 320. In some embodiments, the external connector 340 is formed separately from the inner body 320 and is configured to be inserted and/or secured to the inner body 320. This configuration may be beneficial for allowing a user to change the external connector 340 to a desired connection mechanism. In some embodiments, the external connector 340 may include, but is not limited to, a snap hook, a carabiner, s-hook, spring clip, clip, quick link, or snap ring. In some embodiments, the external connector 340 includes a first prong 342 and a second prong 344. The first and second prongs 342, 344 may be largely rectangular in shape and disposed parallel to each other. The first and second prongs 342, 344 may be separated by a gap 346. The first prong 342 may have a first external connection point 345 disposed on an upper end 347 of the first prong 342. The second prong 344 may have a second external connection point 348 disposed on an upper end 349 of the second prong 344. In some embodiments, the first and second external connection points 345, 348 are aligned along the lengths of the first and second prongs 342, 344 such that a mechanical connector can be disposed through each of the first and second external connection points 345, 348 simultaneously. In some embodiments, each of the first and second external connection points 345, 348 may consist of a hole, such as, but not limited to, a round hole, a countersunk hole, a counterbore hole, a through hole, a blind hole, a tapered hole, a keyhole slot, a dowel hole, or a helical hole.

The external connector 340 is configured to engage with the connection mechanism on an external surface, such as within a boat, truck, or other vehicle, some of which are listed herein. In some embodiments, a feature of the external surface or object or vehicle is inserted into the gap 346 of the external connector 340, where a protrusion or hole of the external surface or vehicle may be aligned with the first and second external connection points 345, 348 of the external connector 340. A mechanical connector may then be disposed or threaded through the protrusion or hole of the external surface or object and the first and second external connection points 345, 348 of the external connector 340, thereby securing the telescoping arm to the external surface or object or vehicle. The external connector 340 is configured to secure the telescoping arm 300 and thereby the base plate 120 and the system 100 to the external surface or vehicle and to prevent the system 100 from moving or tiling while connected to the external surface.

Figure 3D:
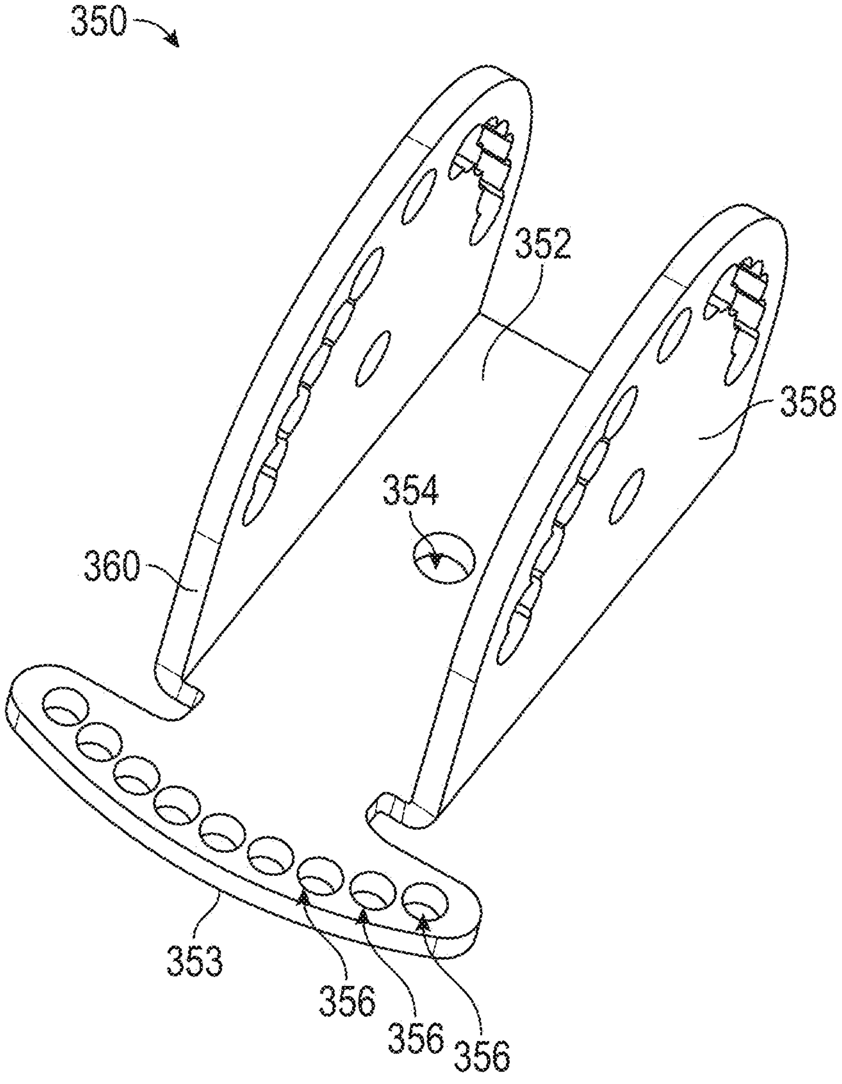
FIG. 3D shows a top isometric view of a base connector of the telescoping arm.

FIG. 3D shows an upper isometric view of the base connector 350. As seen in FIG. 3D, the base connector 350 may include a connector base 352, a first wall 358 and a second wall 360. The connector base 352 may be substantially flat and in a rectangular shape, with the exception of a protrusion 353 integrally formed with the connector base 352. In some embodiments, the protrusion 353 may be generally oval in shape. The connector base 352 may include a first base connection point 354 and a plurality of second base connection points 356. As seen in FIG. 3D, the first base connection point 354 is disposed on the connector base 352 and may be centrally located on the connector base 352.

The first base connection point 354 is configured to secure the base connector 350 to a base plate 120. In some embodiments, the first base connection point 354 may consist of a hole, such as, but not limited to, a round hole, a countersunk hole, a counterbore hole, a through hole, a blind hole, a tapered hole, a keyhole slot, a dowel hole, or a helical hole. In some embodiments, the first base connection point 354 is configured to align with a first arm connection point 127 of the base plate 120 or other hole or connection point, such as a large connection point 124 or mounting point 128, on the base plate 120 and a mechanical connector, such as those described herein, may be threaded through the first base connection point 354 and the mounting point 128 or large cone connection point 124 on the base plate 120 to secure the base connector 350 to the base plate 120. In some embodiments, when the base connector 350 is secured to the base plate 120 via the first base connection point 354, the base connector 350 is able to rotate along an axis extending normal to the connector base 352.

The plurality of second base connection points 356 are disposed on the protrusion 353. In some embodiments, the plurality of second base connection points 356 are disposed on a perimeter of the protrusion 353. In some embodiments, each second base connection points 356 of the plurality of second base connection points are equidistant from the first base connection point 354. In some embodiments, each second base connection point 356 of the plurality of second base connection points 356 may consist of a hole, such as, but not limited to, a round hole, a countersunk hole, a counterbore hole, a through hole, a blind hole, a tapered hole, a keyhole slot, a dowel hole, or a helical hole. In some embodiments, a second base connection point 356 is configured to align with a second arm connection point 129, mounting point 128, or large connection point 124 of the base plate 120 and a mechanical connector, such as those described herein, may be threaded through the aligned second base connection point 356 and the second arm connection point 129, mounting point 128, or large connection point 124 on the base plate 120 to further secure the base connector 350 to the base plate 120. In some embodiments, when the base connector 350 is secured to the base plate 120 via the first base connection point 354, the base connector 350 is able to rotate on an axis extending normal to the connector base 352. The base connector 350 can be secured in a desired orientation by rotating the base connector 350 to the desired orientation and then securing the base connector 350 to the base plate 120 by aligning a second base connection point 356 with a second arm connection point 129, mounting point 128, or large connection point 124 and disposing a mechanical connector through the aligned points. In some embodiments, the plurality of second base connection points 356 allow a change in orientation up to 360 degrees. In some embodiments, the plurality of second base connection points 356 allow a change in orientation up to 180 degrees, up to 90 degrees up to 60 degrees, up to 45 degrees, or up to 30 degrees.

Figure 3E:
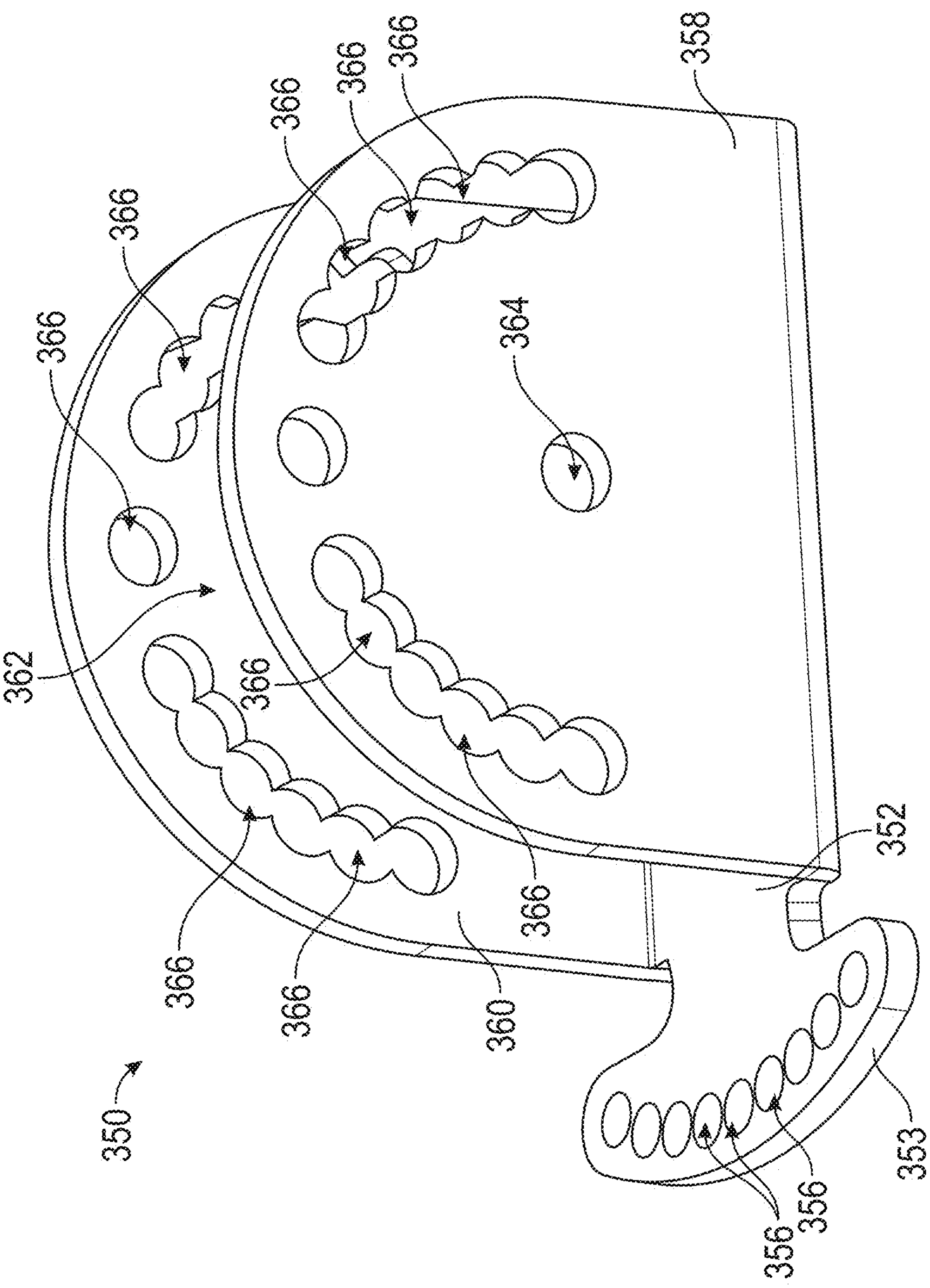
FIG. 3E shows a side isometric view of the base connector of FIG. 3D.

FIG. 3E shows a side isometric view of the base connector 350. As seen in FIG. 3E, the first and second walls 358, 360 extend in a direction normal to the connector base 352. In some embodiments, the first and second walls 358, 360 may be connected to the connector base 352 such that a gap 362 is formed in between the first and second walls 358, 360. In some embodiments, the first and second walls 358, 360 may be generally semi-circular in shape. In some embodiments, the first and second walls 358, 360 may be generally rectangular in shape.

As seen in FIG. 3E, the first and second walls 358, 360 may each include a central connection point 364 and a plurality of perimeter connection points 366. The central connection point 364 may be disposed centrally on each of the first and second walls 358, 360. In some embodiments, the central connection point 364 on each of the first and second walls 358, 360 are aligned such that a mechanical connector can be disposed through each central connection point 364 simultaneously. In some embodiments, each central connection point 364 may consist of a hole, such as, but not limited to, a round hole, a countersunk hole, a counterbore hole, a through hole, a blind hole, a tapered hole, a keyhole slot, a dowel hole, or a helical hole.

The plurality of perimeter connection points 366 are disposed on a perimeter of each of the first and second walls 358, 360. In some embodiments, each connection point 366 of the plurality of perimeter connection points 366 on each of the first and second walls 358, 360 are aligned such that a mechanical connector can be disposed through aligned perimeter connection points 366 on each of the first and second walls 358, 360 simultaneously. In some embodiments, each perimeter connection point 366 may consist of a hole, such as, but not limited to, a round hole, a countersunk hole, a counterbore hole, a through hole, a blind hole, a tapered hole, a keyhole slot, a dowel hole, or a helical hole.

The base connector 350 may be configured to receive the outer body 310 in the gap 362. The outer body 310 can then be secured to the base connector 350 by aligning the lower connection points 314 of the outer body 310 with the central connection points 364 of the base connector 350. A mechanical connector may then be disposed through the aligned central connection points 364 and the lower connection points 314 thereby securing the outer body 310 to the base connector 350. When the outer body 310 is secured to the base connector 350 by the central connection points 364 and the lower connection points 314, the outer body 310 may be free to rotate about an axis extending normally from the first and second walls 358, 360. A user may then rotate the outer body 310 to a desired orientation. Once the outer body 310 is in a desired orientation, the outer body 310 can be secured in the desired orientation by disposing a mechanical connector through corresponding perimeter connection points 366 of the base connector 350 and the upper connection points 316 of the outer body 320. This beneficially allows a user to change the orientation of the telescoping arm 300. In some embodiments, the orientation of the telescoping arm 300 may be changed up to 180 degrees.

The telescoping arm 300 is configured to be secured to the base plate 120 via the base connecter 350. In some embodiments, the telescoping arm 300 is configured to be secured to the base plate 120 in a variety of configurations, such that the telescoping arm 300 can be adjusted in both the horizontal and vertical planes. These configurations are beneficial for allowing the telescoping arm 300 to be secured to a variety of external surfaces, even if the external surfaces have inconsistent connection points.

In some embodiments, the telescoping arm 300 may be configured to be folded against the base plate 120. When the telescoping arm 300 is in this configuration, the telescoping arm 300 may serve as an anchoring point for a strap, hook, clip, or other device for securing the base plate 120 to an external surface.

Figure 4:
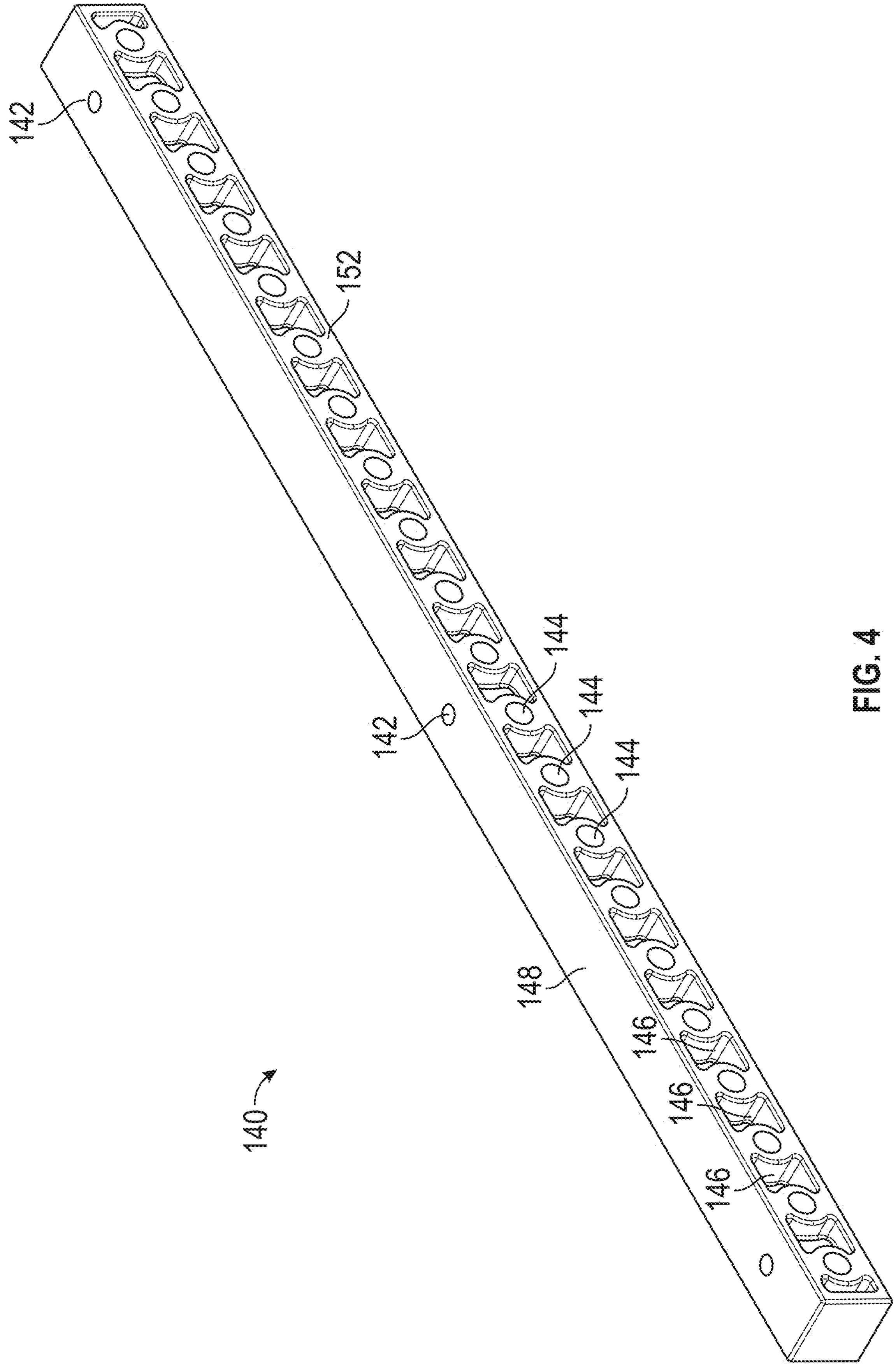
FIG. 4 shows an isometric view of a rail.

FIG. 4 shows an isometric view of a rail 140. As seen in FIG. 4, the rail 140 may be largely rectangular in shape. In some embodiments, the length of the rail 140 may be less than a width of the base plate 120. This configuration may be beneficial for attaching the rail 140 to the base plate 120 without a portion of the rail 140 protruding out from a side of the base plate 120. In some embodiments, the length of the rail 140 may be equal to or greater than a width of the base plate 120.

Each rail 140 is formed from any suitable material, such as a polymer or plastic material, (e.g., polyethylene, high density polyethylene, low density polyethylene, polypropylene, polyvinyl chloride, polycarbonate, resin etc.), a metal material or alloy (e.g., stainless steel, titanium, aluminum, iron, copper, brass, bronze, lead, nickel, etc.) or a composite material (e.g., fiber glass, carbon fiber, etc.). In some embodiments, each rail 140 is formed of polyethylene. In some embodiments, each rail 140 is formed of high density polyethylene. In some embodiments, each rail 140 is formed via injection molding.

The rail 140 includes a plurality of plate connection points 142 and a plurality of holder connection points 144. The plate connection points 142 may be disposed on at least one side of the rail 140. In some embodiments, the plate connection points 142 are disposed on a first surface 148 of the rail 140. In some embodiments, each rail 140 may have one, two or three plate connection points. In some embodiments, each rail 140 has more than three plate connection points 142, such as, but not limited to, four, five, or six plate connection points 142. In some embodiments, the distance between adjacent plate connection points 142 may be the same along the length of the rail 140.

In some embodiments, the plate connection points 142 may consist of a hole, such as, but not limited to, a round hole, a countersunk hole, a counterbore hole, a through hole, a blind hole a tapered hole, a keyhole slot, a dowel hole, or a helical hole. In some embodiments, the plate connection points 142 penetrate though one side of the rail 140 to emerge on an opposite side of the rail 140. In some embodiments, the plate connection points 142 do not penetrate completely through the rail 140.

The rail 140 may be secured to the base plate 120 by aligning the plate connection points 142 with at least a portion of the rail connection points 122 of the base plate 120 and securing the rail 140 to the base plate 120 by means of one of more mechanical connectors being disposed through the aligned rail connection points 122 and plate connection points 142. In some embodiments, mechanical connectors may include, but are not limited to, bolts and nuts, dowels, screws, clips, clamps, fasteners, pins, or keys. In some embodiments, the mechanical connector may be inserted or threaded through a plate connection point 142 and through the rail connection point 122, thereby securing the rail 140 to the base plate 120.

The rail 140 further includes a plurality of holder connection points 144. The holder connection points 144 may be disposed on at least one side of the rail 140. In some embodiments, the holder connection points 144 are disposed on a different side of the rail 140 as the plate connection points 142. In some embodiments, the holder connection points 144 are disposed on a second surface 152 of the rail. In some embodiments, the second surface 152 is orthogonal to the first surface 148. In some embodiments, the holder connection points 144 are disposed on the first surface 148 of the rail 140, in between or adjacent to the plate connection points 142. In some embodiments, each rail 140 may have any number of holder connection points 144, including at least about 1 and/or equal to or less than 50 holder connection points 144, at least about 5 and/or less than or equal to 25 holder connections points 144, or at least about 10 and/or less than or equal to about 20 holder connection points 144. In some embodiments, the distance between adjacent holder connection points 144 is the same along the length of the rail 140.

In some embodiments, each holder connection point 144 may consist of a hole, such as, but not limited to, a round hole, a countersunk hole, a counterbore hole, a through hole, a blind hole a tapered hole, a keyhole slot, a dowel hole, or a helical hole. In some embodiments, at least of the portion of the holder connection points 144 penetrate completely though one side of the rail 140 to emerge on an opposite side of the rail 140. In some embodiments, the holder connection points 144 do not penetrate completely through the rail 140.

In some embodiments, the rail 140 includes a plurality of indents 146. In some embodiments, the indents 146 are located on the same sides of the rail 140 as the holder connection points 144. Each indent 146 may be located in between adjacent holder connection points 144. In some embodiments, each indent 146 may be substantially shaped like an hourglass. In some embodiments, the indents 146 may have a different shape, including, but not limited to, a circle shape, an oval, a square, a rectangle, a hexagon, or any other polygon. In some embodiments, the indents 146 may be beneficial for reducing the amount of material used for the rail 140, thereby reducing the cost and weight of each rail 140.

Figure 5:
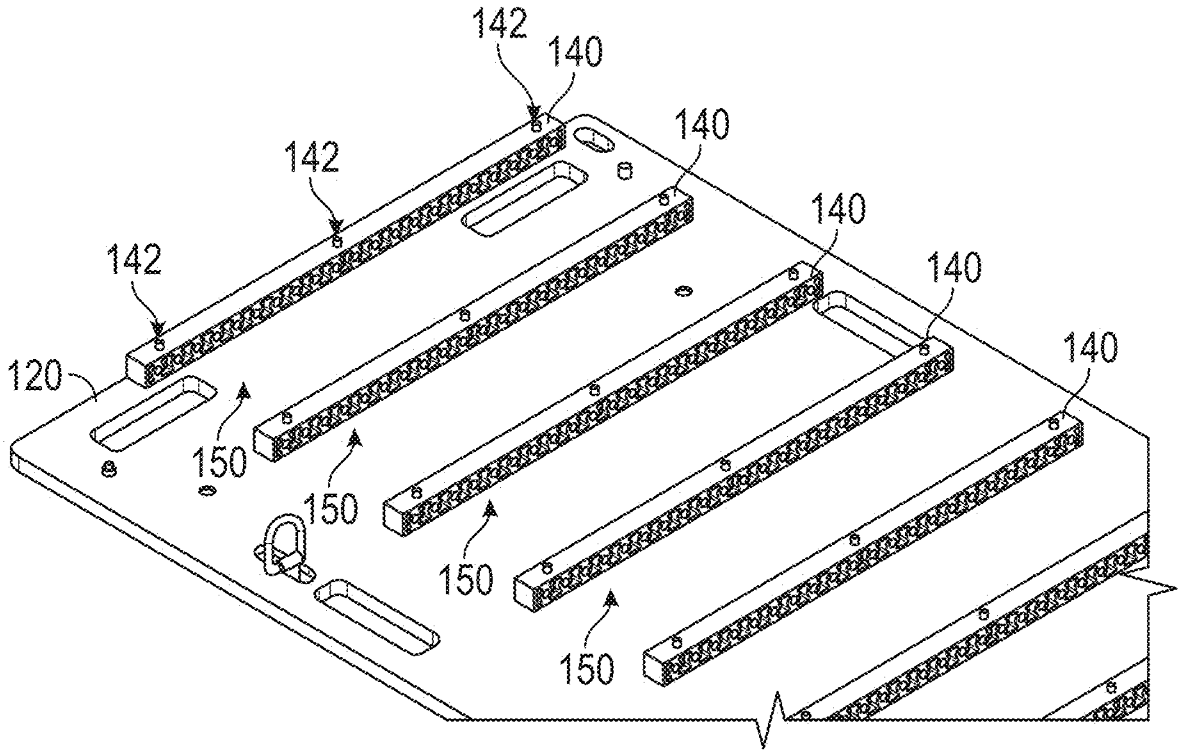
FIG. 5 shows a partial view of the fishing rod holding system with a plurality of rails secured to a base plate.

FIG. 5 shows a partial view of the system 100 with a plurality of rails 140 secured to a base plate 120. As seen in FIG. 5, a plurality of rails 140 may be secured to the base plate 120 by aligning the rail connection points 122 of the base plate 120 with the plate connection points 142 of the rails 140 and securing them by means of at least one mechanical connector being disposed through the aligned plate connection points 142 and rail connection points 122. In some embodiments, the mechanical connector may be inserted or threaded through a plate connection point 142 and through the rail connection point 122, thereby securing the rail 140 to the base plate 120. In some embodiments, the distance between each adjacent rail 140 may be substantially the same along the length of the base plate 120. In some embodiments, a connection channel 150 may be formed between each pair of adjacent rails 140 secured to the base plate 120. The rod holders 160 and pivot arms 180 may be connected to the rail 140 in the connection channels 150 as described herein.

Figure 6:
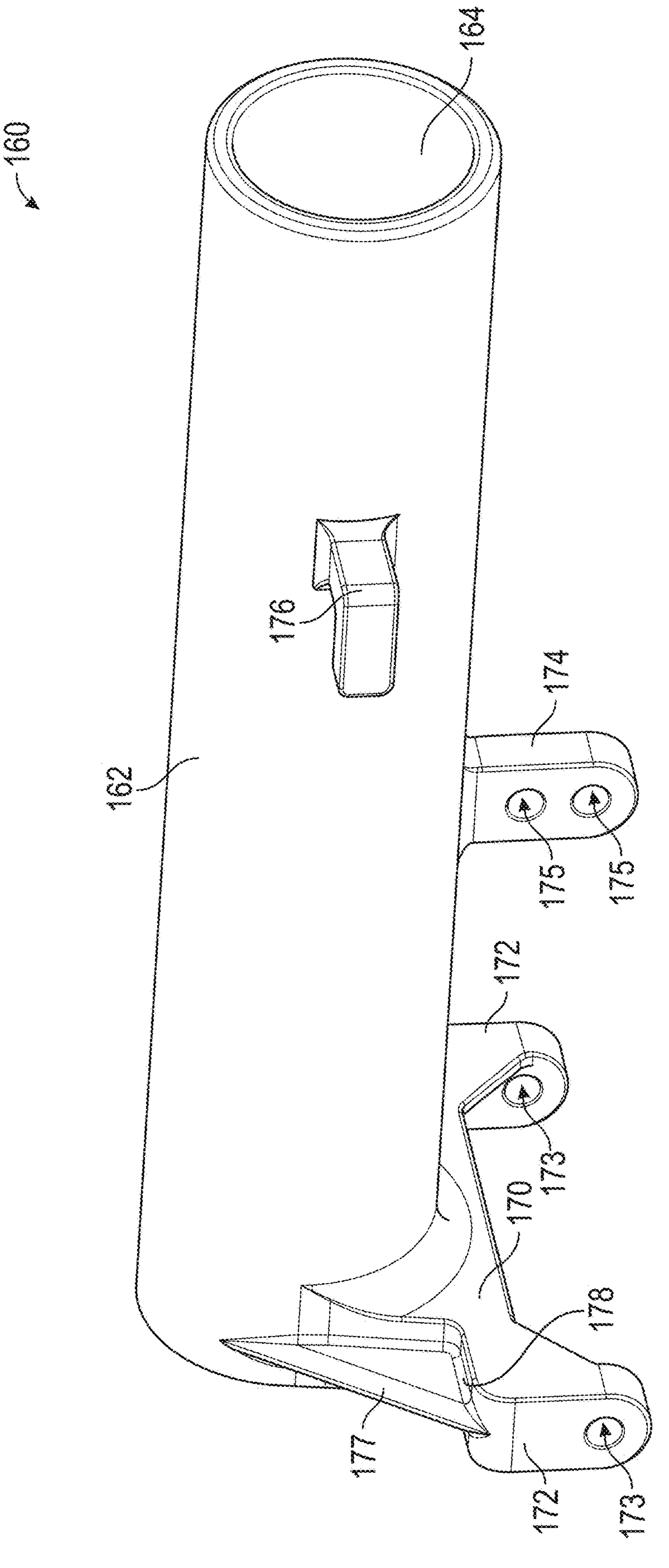
FIG. 6 shows an isometric view of a rod holder.

FIG. 6 shows an isometric view of a rod holder 160. As seen in FIG. 6, the rod holder 160 may include a body 162, a central orifice 164, a rail connector 170, a pivot connector 174, and at least one hook 176.

In some embodiments, the rod holder 160 is formed from any suitable material, such as a polymer or plastic material, (e.g., polyethylene, high density polyethylene, low density polyethylene, polypropylene, polyvinyl chloride, polycarbonate, resin etc.), a metal material or alloy (e.g., stainless steel, titanium, aluminum, iron, copper, brass, bronze, lead, nickel, etc.) or a composite material (e.g., fiber glass, carbon fiber, etc.). In some embodiments, the rod holder 160 is formed of polyethylene. In some embodiments, the rod holder 160 is formed of high density polyethylene. In some embodiments, the rod holder 160 is formed via injection molding.

The body 162 of the rod holder 160 may be substantially cylindrical in shape. The body 162 may be substantially hollow and form the boundaries of an orifice 164. The orifice 164 is formed from the body 162. In some embodiments, the orifice 164 only extends a certain distance through the body 162. In some embodiments, the orifice 164 extends through the entire body 162, thereby forming an opening on opposite sides of the rod holder 160. The orifice 164 is configured to receive the handle of a fishing rod, thereby securing the rod within the rod holder 160. In some embodiments, the orifice 164 is configured to receive and secure other cylindrical shaped objects.

The rail connector 170 is formed on a first end of the rod holder 160. In some embodiments, the rail connector 170 is located on a side opposite to the opening of the orifice 164. In some embodiments, the rail connecter 170 is integrally formed with the body 162 of the rod holder 160. The rail connector 170 may include a plurality of wings 172. Each wing 172 may extend laterally from the body 162 of the rod holder 160. The distance between one end of a wing 172 to the end of another wing 172 may be equal to the width of a connection channel 150 as described herein.

Each wing 172 may include a rail connection point 173. In some embodiments, the rail connection point 173 may consist of a hole, such as, but not limited to, a round hole, a countersunk hole, a counterbore hole, a through hole, a blind hole a tapered hole, a keyhole slot, a dowel hole, or a helical hole. In some embodiments, the rail connection point 173 penetrates though one side of the wing 172 to emerge on an opposite side of the wing 172. In some embodiments, the rail connection point 173 does not penetrate completely through the wing 172.

The rod holder 160 may be secured to a rail 140 or a pair of adjacent rails 140 by aligning the rail connection points 173 of the rod holder 160 with holder connection points 144 of adjacent rails 140 and securing by means of a mechanical connector. In some embodiments, mechanical connectors may include, but are not limited to, bolts and nuts, dowels, screws, clips, clamps, fasteners, pins, or keys. In some embodiments, the mechanical connector may be inserted or threaded through a rail connection point 173 and through the holder connection point 144, thereby securing the rod holder 160 to the rail 140.

In some embodiments, the rail connector 170 includes a surface 177 that further connects the wing 172 to the body 162 of the rod holder 160. The surface 177 may be triangular in shape and extend from an end of a wing 172 to a center point of the body 162 of the rod holder 160. In some embodiments, the surface 177 may be thinner than the rail connector 170 such that a lip 178 is formed from the connection of the surface 177 to the rail connector 170 and/or wing 172.

The rod holder 160 further includes a pivot connector 174. The pivot connector 174 may be centrally located along the length of the rod holder 160. The pivot connector 174 may extend from the rod holder 160 such that it is largely parallel to the wings 172 of the rail connector 170.

The pivot connector 174 may include a plurality of pivot connection points 175. In some embodiments, the pivot connector 174 includes two pivot connection points 175. Each pivot connection point 175 may consist of a hole, such as, but not limited to, a round hole, a countersunk hole, a counterbore hole, a through hole, a blind hole a tapered hole, a keyhole slot, a dowel hole, or a helical hole. In some embodiments, the pivot connection points 175 penetrates though one side of the pivot connector 174 to emerge on an opposite side of the pivot connector 174. In some embodiments, the pivot connection points 175 do not penetrate completely through the pivot connector 174.

The rod holder 160 includes at least one hook 176. The hook or hooks may be disposed along the length of the body 162 of the rod holder 160 in such a manner that the hook 176 is substantially perpendicular to the pivot connector 174 or rail connector 170. The hook 176 may be useful for storing the rod holder 160 when not in secured to a rail 140.

Figure 7:
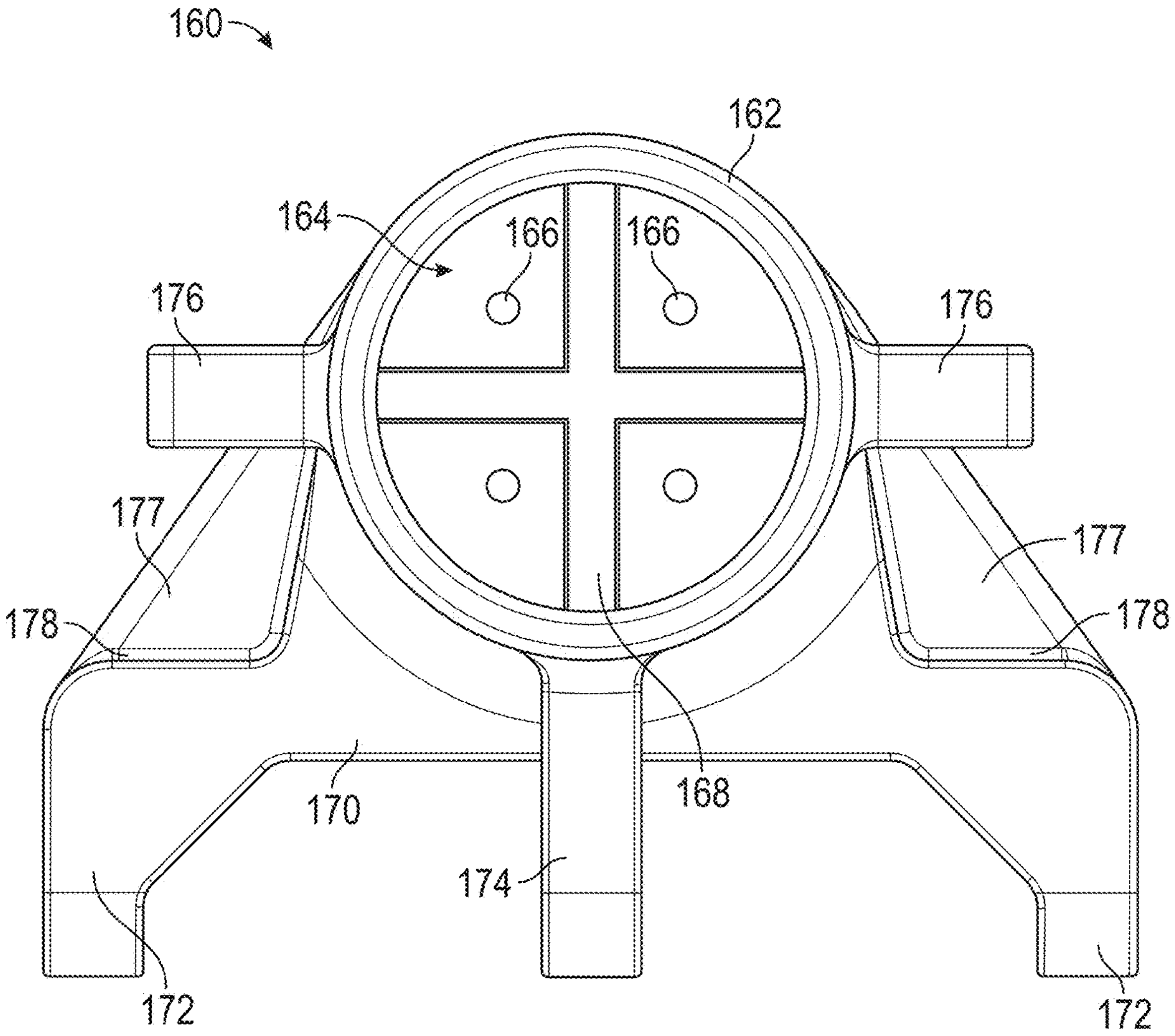
FIG. 7 shows a front view of the rod holder.

FIG. 7 shows a front view of the rod holder 160. As seen in FIG. 7, the rod holder 160 may include at least one hole 166 and a support 168. The plurality of holes 166 may be formed on an end of the body 162 of the rod holder 160 opposite to the opening of the orifice 164. In some embodiments, the at least one hole 166 may include 1, 2, 3, 4, 5, 6, 7, 8 or more holes. The holes 166 may serve to prevent a vacuum from being formed with the orifice 164 or prevent air from being trapped in the orifice 164 when a rod holder or other cylindrical object is inserted in the rod holder 160.

The supports 168 may be a raised surface formed on the same surface as the holes 166. The support 168 may be substantially cross-shaped in nature. The support 168 may serve to support a fishing rod or other cylindrical object when disposed within the rod holder 160.

Figure 8A:
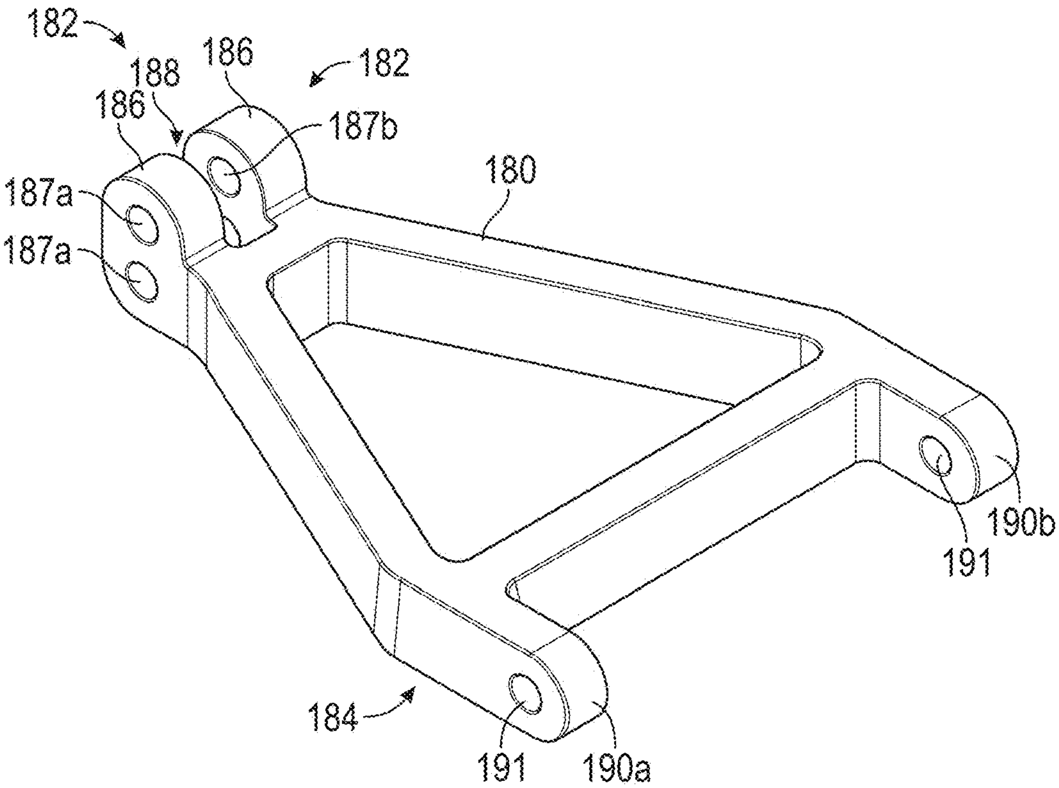
FIG. 8A shows an isometric view of a pivot arm.

FIG. 8A shows an isometric view of pivot arm 180. In some embodiments, the pivot arm 180 is roughly triangular in shape. In some embodiments, the pivot arm 180 is formed from any suitable material, such as a polymer or plastic material, (e.g., polyethylene, high density polyethylene, low density polyethylene, polypropylene, polyvinyl chloride, polycarbonate, resin etc.), a metal material or alloy (e.g., stainless steel, titanium, aluminum, iron, copper, brass, bronze, lead, nickel, etc.) or a composite material (e.g., fiber glass, carbon fiber, etc.). In some embodiments, the pivot arm 180 is formed of polyethylene. In some embodiments, the pivot arm 180 is formed of high density polyethylene. In some embodiments, the pivot arm 180 is formed via injection molding.

The pivot arm 180 may include a top portion 182 and a bottom portion 184. The top portion 182 may include a plurality of holder connectors 186. In some embodiments, the pivot arm 180 may include two holder connectors 186. The holder connectors 186 may be spaced such that there is a gap 188 between the holder connectors 186. The gap 188 may be of a sufficient width that the pivot connector 174 of the rod holder 160 is able to be inserted into the gap 188.

Each holder connector 186 may include at least one holder connection point 187*a*, 187*b*. Each holder connection point 187*a*, 187*b* may consist of a hole, such as, but not limited to, a round hole, a countersunk hole, a counterbore hole, a through hole, a blind hole a tapered hole, a keyhole slot, a dowel hole, or a helical hole. In some embodiments, the holder connection point 187*a*, 187*b* penetrates though one side of the holder connector 186 to emerge on an opposite side of the holder connector 186. In some embodiments, the holder connection points 187*a*, 187*b* do not penetrate completely through the holder connector 186.

The pivot arm 180 may be secured to the rod holder 160 by inserting the pivot connector 174 of the rod holder 160 between the holder connectors 186 of the pivot arm 180, aligning at least one of the pivot connections points 175 with at least one of the holder connection points 187*a*, 187*b* of each of the holder connectors 186, and securing by means of a mechanical connector. In some embodiments, mechanical connectors may include, but are not limited to, bolts and nuts, dowels, screws, clips, clamps, fasteners, pins, or keys. In some embodiments, the mechanical connector may be inserted or threaded through a first holder connection point 187*a*, through a pivot connection point 175, and through the second holder connection 187*b* point thereby securing the pivot arm 180 to the rod holder 160.

The bottom portion 184 of the pivot arm 180 includes at least one wing 190*a*, 190*b*. The distance between an end of a first wing 190*a* and an end of a second wing 190*b* may be equal to or substantially similar to the width of a connection channel 150. Each wing 190*a*, 190*b* may include at least one rail connection point 191. In some embodiments, each rail connection point 191 may consist of a hole, such as, but not limited to, a round hole, a countersunk hole, a counterbore hole, a through hole, a blind hole a tapered hole, a keyhole slot, a dowel hole, or a helical hole. In some embodiments, the rail connection point 191 penetrates though one side of the wing 190*a*, 190*b* to emerge on an opposite side of the wing 190*a*, 190*b*. In some embodiments, the rail connection point 191 does not penetrate completely through the wing 190*a*, 190*b*.

The pivot arm 180 may be secured to a rail 140 or a pair of adjacent rails 140 by aligning the rail connection points 191 of the pivot arm 180 with holder connection points 144 of adjacent rails 140 and securing by means of a mechanical connector. In some embodiments, mechanical connectors may include, but are not limited to, bolts and nuts, dowels, screws, clips, clamps, fasteners, pins, or keys. In some embodiments, the mechanical connector may be inserted or threaded through a rail connection point 191 and through the holder connection point, thereby securing the pivot arm 180 to the base rail.

Figure 8B:
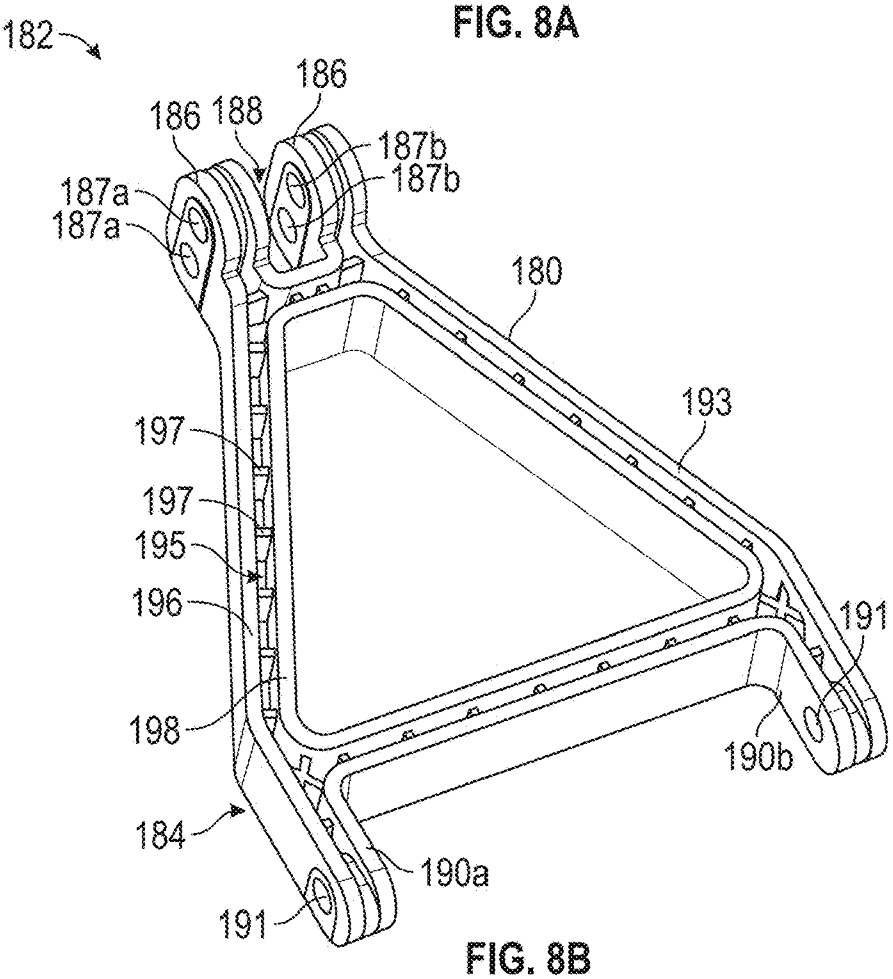
FIG. 8B shows a top isometric view of a pivot arm.

FIG. 8B shows a top isometric view of the pivot arm 180. As seen in FIG. 8B, in some embodiments, the body 193 of the pivot arm 180 may be substantially hollow thereby forming an arm channel 195 within the body 193. In some embodiments, the channel 195 may include a plurality of arms 197 connecting a first side 196 of the arm channel 195 to a second side 198 of the arm channel. This configuration may be beneficial for accommodating injection molding manufacturing of the pivot arm 180.

Figure 9:
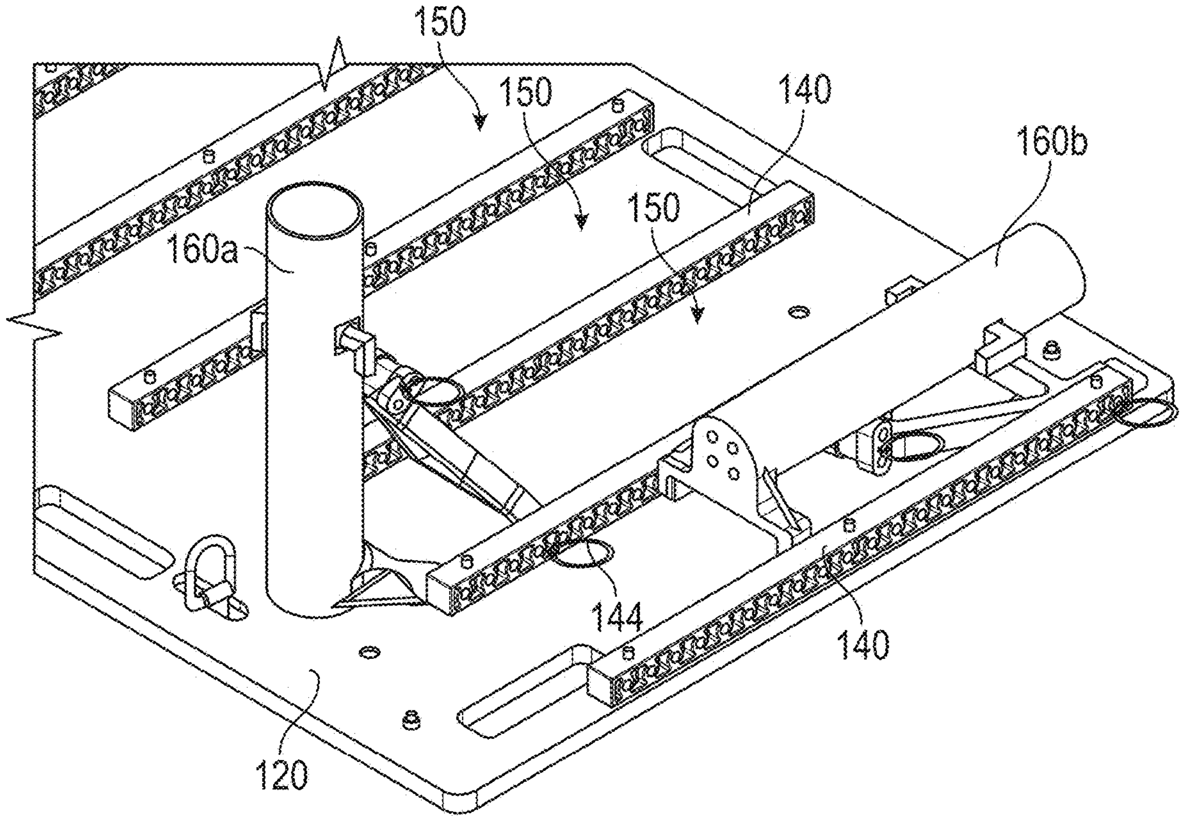
FIG. 9 shows a partial view of a fishing rod holding system with rod holders disposed with different orientations.

FIG. 9 shows a partial view of a system 100 with rod holders 160 disposed with different orientations. The system 100 as described beneficially allows for a variety of options for securing a rod holder 160 and pivot arm 180. After the rails 140 are secured to the base plate 120, a rod holder 160 may be secured to a pair of adjacent rails 140 in the connection channel 150. A rod holder 160 may be secured to a pair of adjacent rails 140 by aligning the rail connection points 173 of a rod holder 160 with holder connection points 144 of adjacent rails 140 and securing by means of a mechanical connector as described herein. In some embodiments, the mechanical connector is a pin. The position of the rod holder 160 within the connection channel 150 may be changed by removing the mechanical connector securing the rod holder 160 to adjacent rails 140 and securing the rod holder 160 at a different holder connection point 144 of the rails 140. Once the rod holder 160 has been secured to a pair of rails 140 at a desired location, the rod holder 160 is free to rotate between an angular orientation where the rod holder 160 is normal to the base plate 120 (rod holder 160*a* as seen in FIG. 9) and an angular orientation where the rod holder 160 is substantially parallel to the base plate 120 (rod holder 160*b* as seen in FIG. 9). Once the rod holder 160 has been rotated to a desirable angular orientation, the rod holder 160 may secured in said angular orientation by aligning a pivot connection point 175 of the rod holder 160 with a holder connection point 187*a*, 187*b* of the pivot arm 180 and securing by means of a mechanical connector. In some embodiments, the mechanical connector is a pin. After the pivot arm 180 has been secured to the rod holder 160, the pivot arm is secured to a pair of adjacent rails by aligning the rail connection points 191 of the pivot arm 180 with the desired holder connection points 144 of the rails 140 and securing by means of a mechanical connector. In some embodiments, the mechanical connector is a pin. The angular orientation of a rod holder 160 may be changed by removing the mechanical connector securing the pivot arm 180 to the rails 140 and securing the pivot arm 180 at a different holder connection point 144. A holder connection point 144 that is closer to the base of the rod holder 160 will result in angular orientation that is closer to being normal to the base plate 120 than the previous angular orientation. A holder connection point 144 that is further from the base of the rod holder 160 will result in an angular orientation of the rod holder 160 that is closer to being parallel to the base plate 120 than the previous angular orientation.

The angular orientation of the rod holder may be further adjusted by removing the mechanical connector securing the rod holder 160 to the pivot arm 180 and securing the rod holder 160 to the pivot arm 180 at a different holder connection point 187*a*, 187*b* of the pivot arm 180 and/or at a different pivot connection point 175 of the rod holder 160. Adjusting the angular orientation in this manner may result in a smaller change to the angular orientation of the rod holder 160 than by changing the position where the pivot arm 180 is connected to the rails 140.

The configurations described herein are beneficial for allowing a plurality of rod holders 160 and pivot arms 180 to be attached to a plurality of rails 140 with connection channels 150 formed between a pair of adjacent rails 140 in a variety of configurations. The angular orientation and position along the length of the rails 140 of each rod holder 160 is independently configurable without altering the angular orientation and position of the other rod holders 160.

Figure 10:
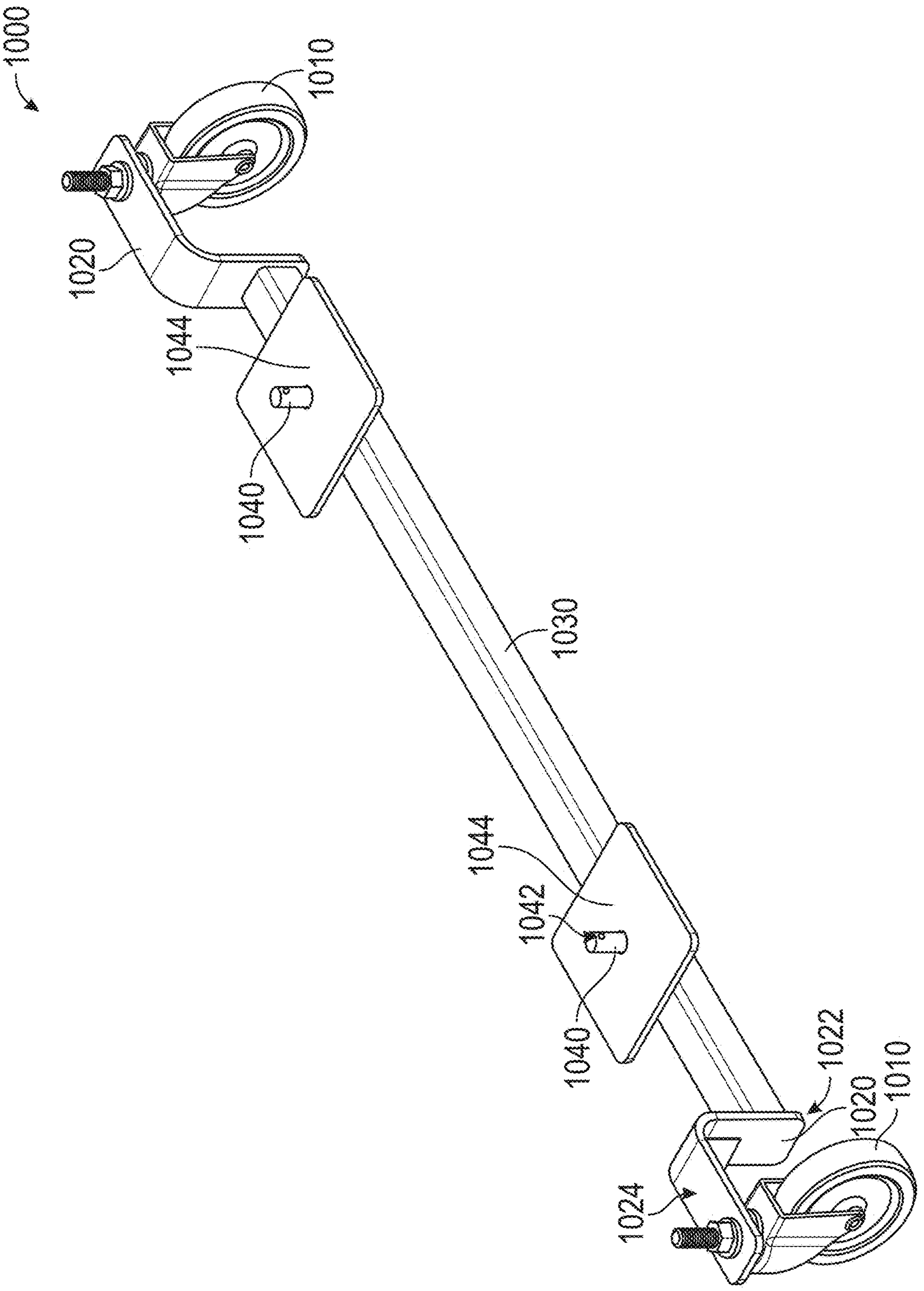
FIG. 10 shows an isometric view of a cart feature.

FIG. 10 shows a cart feature 1000 that can be secured to the base plate 120. As seen in FIG. 10 the cart feature may include at least one wheel 1010, at least one wheel mount 1020, a cross bar 1030 and at least one base connection feature 1040.

The cross bar 1030 may have a cross-section that is generally rectangular or square in shape. In some embodiments, the cross bar 1030 may be cylindrical in shape. In some embodiments, the cross bar 1030 may be hollow. The cross bar 1030 may have a length that is approximately the same as a width of the base plate 120. The wheel mounts 1020 may be connected to the cross bar 1030 at either end of the cross bar 1030. In some embodiments, the wheel mounts 1020 may be generally L-shaped. In some embodiments, the cross bar 1030 may be connected to the wheel mounts 1020 at a bottom portion 1022 of the wheel mount 1020, such that a portion of the wheel mount 1020 extends above the cross bar 1030. In some embodiments, the distance between opposite wheel mounts 1020 is approximately the same as the width of the base plate 120, such that the base plate 120 can be disposed between each of the wheel mounts 1020. A wheel 1010 is connected to each wheel mount 1020 such that the wheel 1010 extends downward from a top portion 1024 of the wheel mount 1020. In some embodiments, the wheels 1010 are rotatably connected to the wheel mounts 1020 such that when the cart feature 1000 is connected to the base plate 120, the system 100 can be pushed or pulled in any direction.

The base connection features 1040 are disposed on the cross bar 1030. There may be one or more base connection features 1040 disposed on the cross bar 1030. In some embodiments, the base connection features 1040 may be cylindrical in shape. In some embodiments, the base connection features 1040 may be configured to be disposed through at least one large connection point 124 of the base plate 120 or through another connection point of the base plate, such as a mounting point 128 of the base plate 120. Once the base connection features 1040 are disposed through at least one large connection point 124 or mounting point 128 of the base plate 120, a mechanical connector, such as a pin or other connector described herein, may be placed through an upper orifice 1042 of the base connection feature 1040 to secure the cart feature 1000 to the base plate 120. In some embodiments, each connection feature 1040 includes a rest 1044. The rest 1044 may be square or rectangular in shape. In some embodiments, the rests 1044 may be in another shape, such as a triangle, oval, circle, polygon, hexagon or other shape. In some embodiments, the rests are configured to provide support to the base plate 120 when it is disposed on the cart feature 1000.

In some embodiments, multiple cart features 1000 can be attached to the base plate 120 to facilitate transportation. For example, a first cart feature 1000 can be secured to a front end of the base plate 120 while a second cart feature 1000 is secured to back end of the base plate, thereby allowing the base plate 120 to be transported more easily.

Figure 11A:
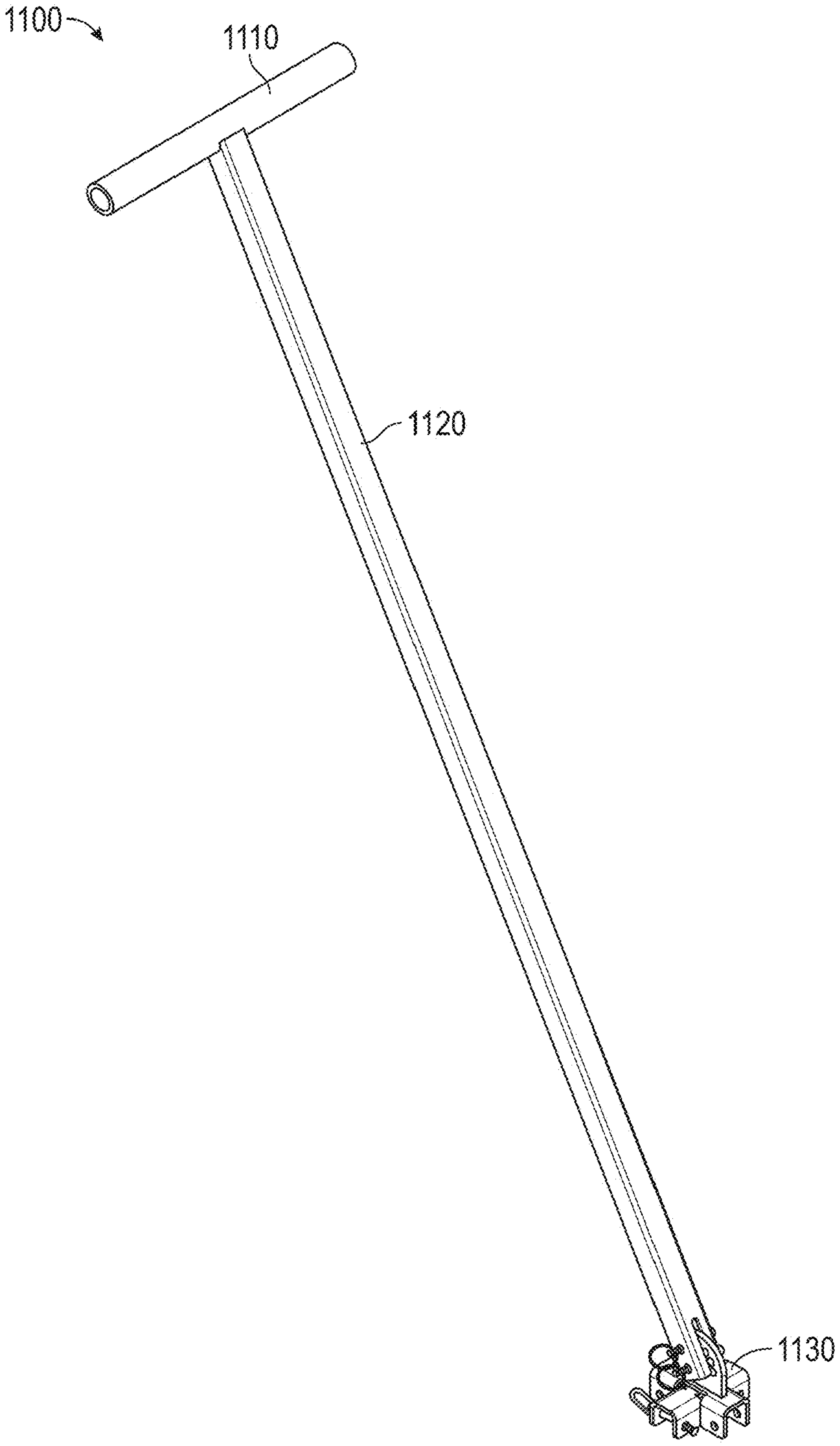
FIG. 11A shows an isometric view of a handle feature.

FIG. 11A shows an isometric view of a handle feature 1100. In some embodiments, the handle feature 1100 may be utilized in conjunction with the cart feature 1000. As seen in FIG. 11A, the handle feature 1100 may include a handle 1110, a central beam 1120, and a handle base 1130.

The handle 1110 may be connected orthogonally to the central beam 1120, thus facilitating a user to grip and pull and/or push the handle 1110. In some embodiments, the handle 1110 is integrally formed with the central beam 1120. The central beam 1120 is connected to the handle 1110. In some embodiments, the central beam 1120 is connection to the handle at a central location.

Figure 11B:
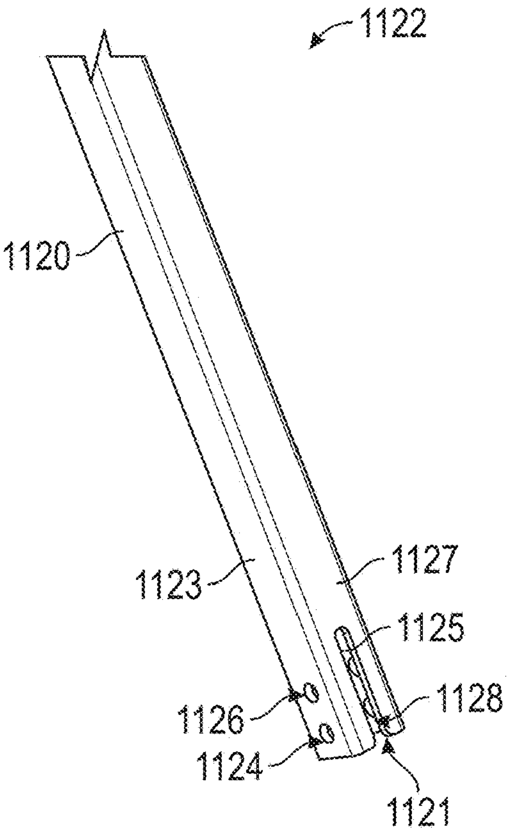
FIG. 11B shows an isometric view of a bottom portion of the central bar of the handle feature.

FIG. 11B shows a bottom portion 1122 of the central beam 1120. The central beam 1120 may have a cross-section that is substantially square or rectangular in shape with a hollow center. At a first end 1121 of the central beam 1120, the central beam 1120 may include at least one lower base connection point 1124 and at least one upper base connection point 1126. In some embodiments, there are two lower base connection points 1124 and two upper base connection points 1126, a lower base connection point 1124 and an upper base connection point 1126 on a first side 1123 of the central beam 1120 and a lower base connection point 1124 and an upper base connection point 1126 on a second side 1125 of the central beam 1120. In some embodiments, the lower base connection points 1124 are aligned along a length of central beam 1120 such that a mechanical connector can be disposed through each lower base connection point 1124 simultaneously. In some embodiments, the upper base connection points 1126 are aligned along a length of central beam 1120 such that a mechanical connector can be disposed through each upper base connection point 1126 simultaneously. In some embodiments, each of the lower base connection points 1124 and the upper base connection points 1126 may consist of a hole, such as, but not limited to, a round hole, a countersunk hole, a counterbore hole, a through hole, a blind hole, a tapered hole, a keyhole slot, a dowel hole, or a helical hole.

The central beam 1120 may also include at least one protrusion gap 1128. The protrusion gap 1128 may be located at the first end 1121 of the central beam 1120. The protrusion gap 1128 may be of a sufficient height and width to receive the base protrusion 1160 of the handle base 1130 as described below. In some embodiments, there may be two protrusion gaps 1128, a first protrusion gap 1128 located on a third side 1127 of the central beam 1120 and a second protrusion gap 1128 location on a fourth side (not seen) of the central beam 1120. The first and second protrusion gaps 1128 may be aligned along a width of the third side 1127 and a width of the fourth side (not seen).

Figure 11C:
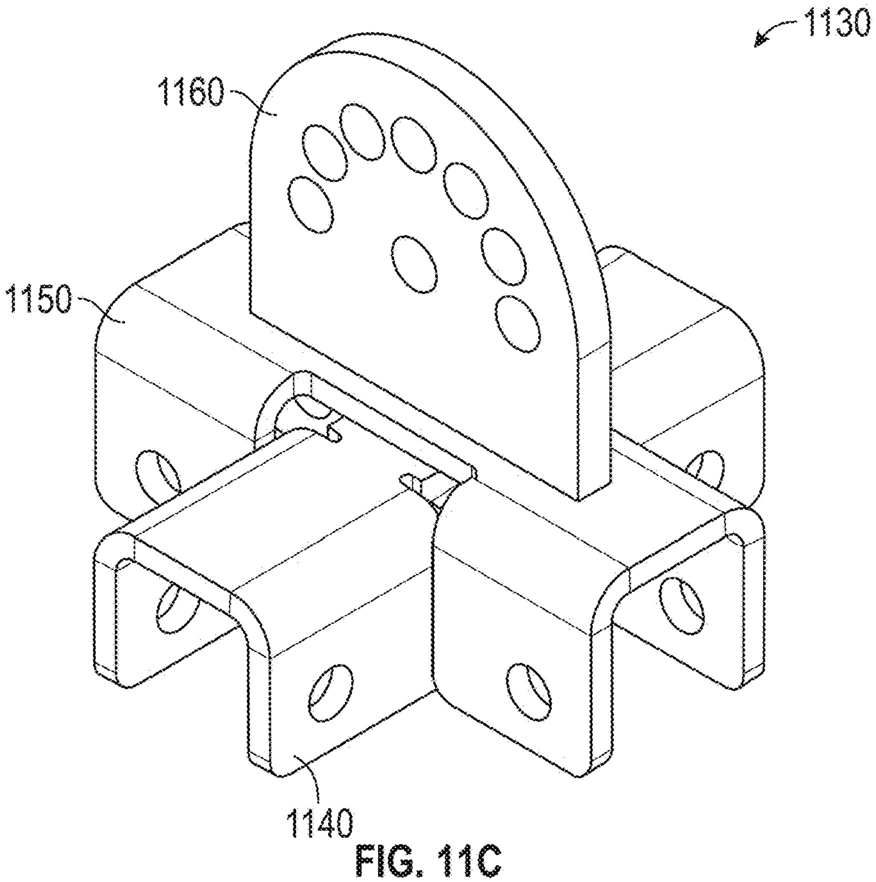
FIG. 11C shows an isometric view of the handle base of the handle feature.

FIG. 11C shows an isometric view of a handle base 1130. As seen in FIG. 11C, the handle base 1130 may include a bottom portion 1140 and a top portion 1150 and a base protrusion 1160.

Figure 11D:
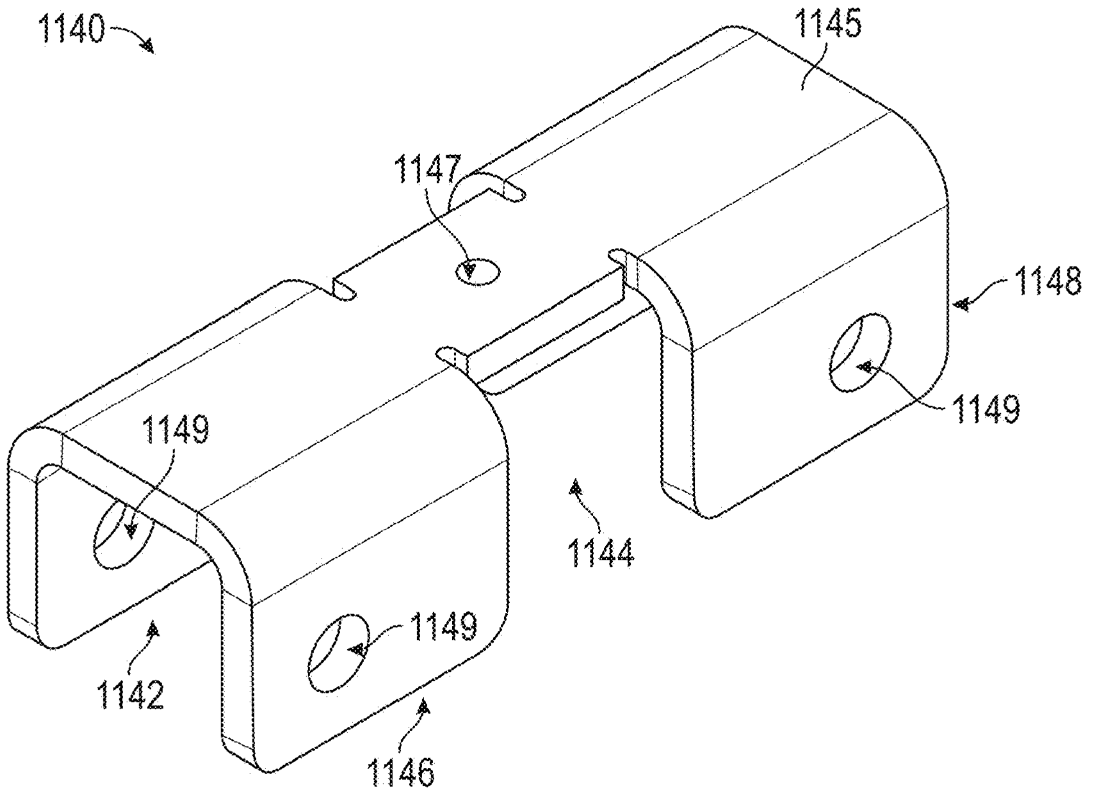
FIG. 11D shows an isometric view of the bottom portion of the handle base.

FIG. 11D shows an isometric view of the bottom portion 1140. The bottom portion 1140 may be in the form of an open rectangular. The bottom portion 1140 may also be hollow forming a bottom rail channel 1142. The bottom rail channel 1142 may be of a sufficient height and width to allow a rail 140 as described above to be disposed within the bottom rail channel 1142. The bottom portion 1140 may also include a top portion gap 1144 formed between a first end 1146 of the bottom portion 1140 and a second end 1148 of the bottom portion 1140. The top portion gap 1144 may be of a sufficient height and width to allow a rail 140 as described above to pass through the top portion gap 1144. In some embodiments, the top portion gap 1144 is orthogonal and/or perpendicular to the bottom rail channel 1142.

The bottom portion 1140 may also include a top portion connection point 1147. The top portion connection point 1147 may be centrally located on a top surface 1145 of the bottom portion 1140. In some embodiments, the top portion connection point 1147 may consist of a hole, such as, but not limited to, a round hole, a countersunk hole, a counterbore hole, a through hole, a blind hole, a tapered hole, a keyhole slot, a dowel hole, or a helical hole.

The bottom portion 1140 may also include at least one rail connection points 1149. In some embodiments, the bottom portion 1140 includes a plurality of rail connection points 1149. In some embodiments, the bottom portion 1140 includes a pair of aligned rail connection points 1149 on the first end 1146 of the bottom portion 1140 and a pair of aligned rail connection points 1149 on the second end 1148 the bottom portion 1140. The bottom portion 1140 may be secured to a rail 140 as described herein by disposing the bottom portion 1140 over the rail 140 such that the rail 140 is disposed within the bottom rail channel 1142. In this configuration, at least one rail connection point 1149 may be aligned with at least one holder connection point 144 of the rail 140. A mechanical connector as described herein may be disposed through the aligned at least one rail connection point 1149 and the holder connection point 144, thereby securing the bottom portion 1140 to the rail 140.

Figure 11E:
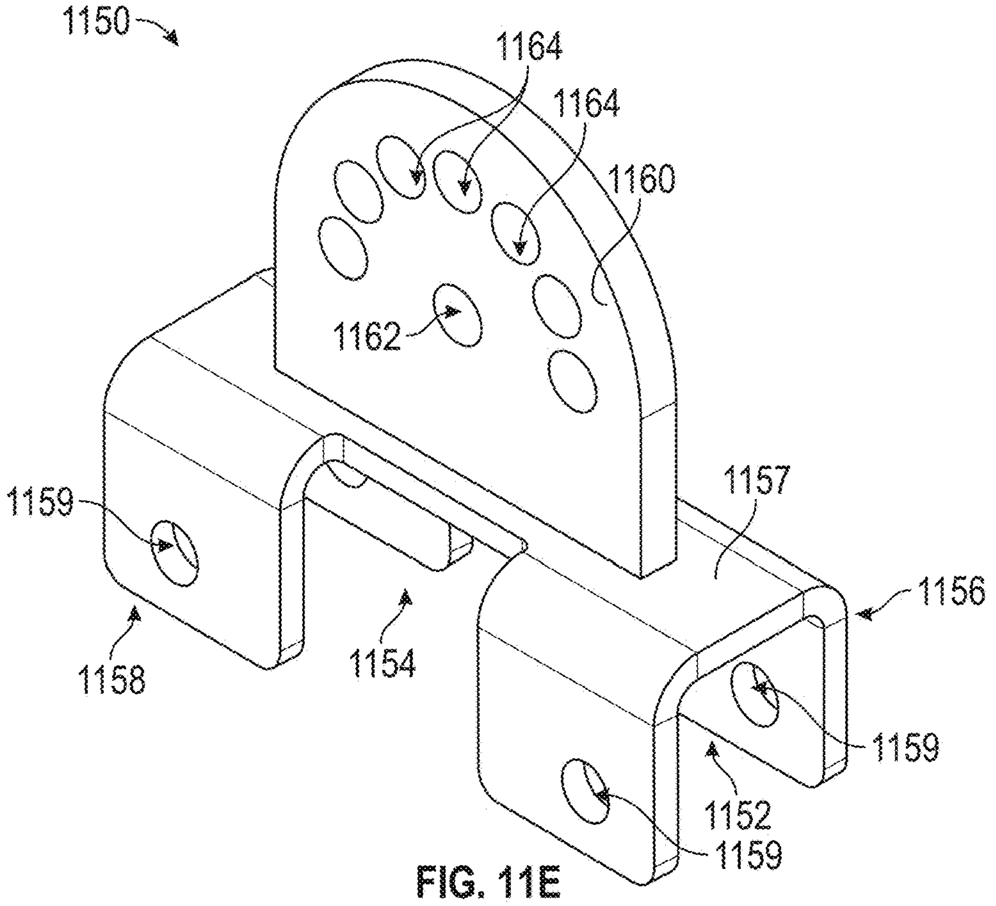
FIG. 11E shows an isometric view of the top portion of the handle base

FIG. 11E shows an isometric view of the top portion 1150. The top portion 1150 may be in the form of an open rectangular. The top portion 1150 may also be hollow forming a top rail channel 1152. The top rail channel 1152 may be of a sufficient height and width to allow a rail 140 as described herein to be disposed within the top rail channel 1152. The top portion 1150 may also include a bottom portion gap 1154 formed between a first end 1156 of the top portion 1150 and a second end 1158 of the top portion 1150. The bottom portion gap 1154 may be of a sufficient height and width to allow the bottom portion 1140 as described above to be disposed within the bottom portion gap 1154. In some embodiments, the bottom portion gap 1154 is orthogonal and/or perpendicular to the top rail channel 1152.

The top portion 1150 may be secured to the bottom portion 1140 by means of a mechanical connector connected to the top portion 1150 or integrally formed with the top portion 1150 being disposed through the top portion connection point 1147 of the bottom portion 1140. The bottom portion 1140 may be disposed through the bottom portion gap 1154 of the top portion 1150 when secured together thereby forming a general t-shape when the handle base 1130 is assembled (as seen in FIG. 11A).

The top portion 1150 may also include at least one rail connection points 1159. In some embodiments, the top portion 1150 includes a plurality of rail connection points 1159. In some embodiments, the top portion 1150 includes a pair of aligned rail connection points 1159 on the first end 1156 of the top portion 1150 and a pair of aligned rail connection points 1159 on the second end 1158 of the top portion 1150. The top portion 1150 may be secured to a rail 140 by disposing the top portion 1150 over the rail 140 such that the rail 140 is disposed within the top rail channel 1152. If the top portion 1150 is also secured to the bottom portion 1140, the rail 140 is simultaneously disposed within the top portion gap 1144 of the bottom portion 1140. In this configuration, at least one rail connection point 1159 may be aligned with a holder connection point 144 of the rail 140. A mechanical connector may be disposed through the aligned at least one rail connection point 1159 of the top portion 1150 and the holder connection point 144 of the rail 140, thereby securing the bottom portion 1140 to the rail 140.

This beneficially allows a user to attach the handle base 1130 to the base plate 120 and rails 140 in a variety of configurations. For example, a user can attach the handle base 1130 to a rail 140 such that the handle base 1130 is centered along a width of the base plate 120. In this configuration, the rail 140 may be disposed through the bottom rail channel 1142 of the bottom portion 1140. In another configuration, the user can attach the handle base 1130 to a rail 140 such that the handle base 1130 is centered along a length of the base plate 120. In this configuration the rail 140 may be disposed through the top rail channel 1152 of the top portion 1150 and the top portion gap 1144 of the bottom portion 1140.

The base protrusion 1160 is connected to a top surface 1157 of the top portion 1150 of the handle base 1130. In some embodiments, the base protrusion 1160 is integrally formed with the top portion 1150. As seen in FIG. 11E, the base protrusion 1160 extends in a direction normal to the top surface 1157 of top portion 1150. In some embodiments, the base protrusion 1160 is generally parallel to the length of the top rail channel 1152. In some embodiments, the base protrusion 1160 may be generally semi-circular in shape. In some embodiments, the base protrusion 1160 may be generally rectangular in shape. As seen in FIG. 11E, the base protrusion 1160 may each include a central connection point 1162 and a plurality of perimeter connection points 1164. The central connection point 1162 may be disposed centrally on the base protrusion 1160. In some embodiments, the central connection point 1162 may consist of a hole, such as, but not limited to, a round hole, a countersunk hole, a counterbore hole, a through hole, a blind hole, a tapered hole, a keyhole slot, a dowel hole, or a helical hole.

The plurality of perimeter connection points 1164 are disposed along a perimeter of the base protrusion 1160. In some embodiments, each perimeter connection point 1164 may consist of a hole, such as, but not limited to, a round hole, a countersunk hole, a counterbore hole, a through hole, a blind hole, a tapered hole, a keyhole slot, a dowel hole, or a helical hole.

The central beam 1120 may be configured to receive the base protrusion 1160 in the protrusion gap 1128. The central beam 1120 can then be secured to the handle base 1130 by aligning the lower base connection points 1124 of the central beam 1120 with the central connection point 1162 of the base protrusion 1160 of the handle base 1130. A mechanical connector may then be disposed through the central connection point 1162 and the lower connection points 1124 thereby securing the central beam 1120 to the base connector 350. When the central beam 1120 is secured to the handle base 1130 by the central connection point 1162 and the lower connection points 1124, the central beam 1120 may be free to rotate about an axis extending normally from the base protrusion 1160. A user may then rotate the central beam 1120 to a desired orientation. Once the central beam 1120 is in a desired orientation, the central beam 1120 can be secured in the desired orientation by disposing a mechanical connector through a corresponding perimeter connection point 1164 of the base protrusion 1160 and the upper connection points 1126 of the central beam 1120. This beneficially allows a user to change the orientation of the handle feature 1100. In some embodiments, the orientation of the handle feature may be changed up to 180 degrees.

Figure 12B:
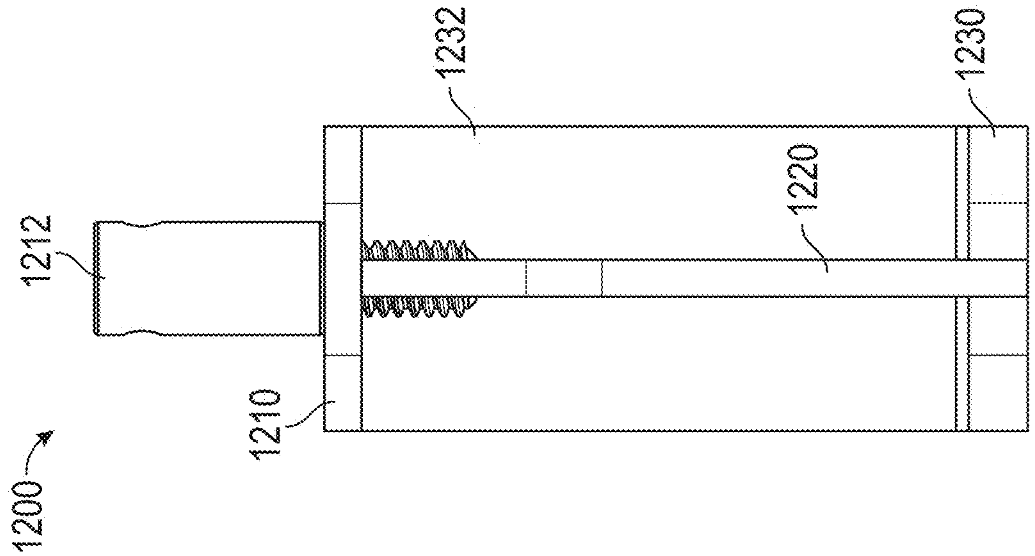
FIG. 12B shows a front view of a t-track feature.
Figure 12A:
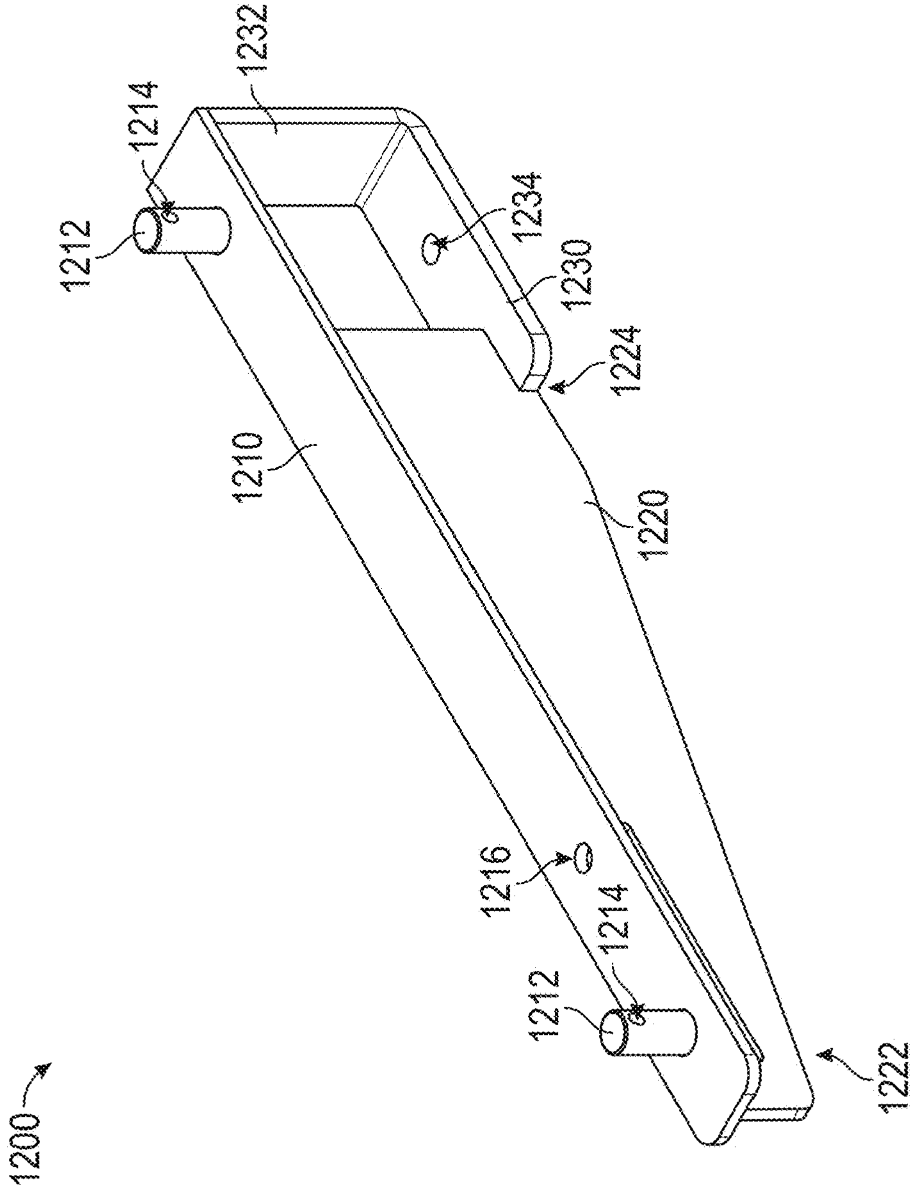
FIG. 12A shows an isometric view of a t-track feature.

FIG. 12A shows an isometric view of a t-track feature 1200. The t-track feature 1200 includes a top surface 1210, a bottom surface 1230 and a vertical surface 1220. As seen in FIG. 12A, the top surface may be generally rectangular in shape. The top surface 1210 may include at least one connection feature 1212. The connection features 1212 are disposed on the top surface 1210. There may be one or more connection features 1212 disposed on the top surface 1210. In some embodiments, the connection features 1212 may be cylindrical in shape. In some embodiments, the connection features 1212 may be configured to be disposed through at least one large connection point 124 of the base plate 120 or through another connection point of the base plate, such as a mounting point 128 of the base plate 120. Once the base connection features 1040 are disposed through at least one large connection point 124 or mounting point 128 of the base plate 120, a mechanical connector, such as a pin or other connector described herein, may be placed through an upper orifice 1214 of the base connection feature 1212 to secure the t-track feature 1200 to the base plate 120. In some embodiments, the connection features 1212 are removably connected the top surface 1210. In some embodiments, the top surface 1210 may include a connection feature point 1216. The connection feature point may be a hole, such as, but not limited to, a round hole, a countersunk hole, a counterbore hole, a through hole, a blind hole, a tapered hole, a keyhole slot, a dowel hole, or a helical hole. The connection feature point 1216 may serve to attach a connection feature 1212 to the top surface 1210. This beneficially allows a user to change the distance between connection features 1212.

The vertical surface 1220 may extend downward from top surface 1210, thereby forming a t-shape with the top surface.

The vertical surface 1220 may be angled such that a height of the vertical surface is smaller at a first end 1222 of the vertical surface 1220 than at a second end 1224 of the vertical surface 1220. At the second end 1224 of the vertical surface 1220, the vertical surface 1220 may be connected to the bottom surface 1230. The bottom surface 1230 may be rectangular in shape. In some embodiments, the bottom surface 1230 and the vertical surface may form a t-shape (as seen in FIG. 12B). The bottom surface may be connected to the top surface 1210 by means of a side wall 1232 extending from the bottom surface 1230 to the top surface 1210. The bottom surface 1230 may also include a surface connection point 1234. The surface connection point 1234 may be a hole such as, but not limited to, a round hole, a countersunk hole, a counterbore hole, a through hole, a blind hole, a tapered hole, a keyhole slot, a dowel hole, or a helical hole. The surface connection point 1234 may be configured to secure the t-track feature 1200 to an external surface or object.

In some embodiments, the t-track feature 1200 is secured to the base plate 120 by means of the connection features 1212. The t-track feature 1200 can be slid into a corresponding t-track on an external object or surface, such as a truck, boat, car, or other vehicle, some of which are listed herein. In such a configuration, the t-shape formed by the bottom surface 1230 and the vertical surface 1220 may correspond to the t-shaped gap in the t-track. Once placed in a desired orientation, the t-track feature 1200 may then be secured to the external object or surface by means of a mechanical feature being disposed through the surface connection point 1234 and into the external object or feature.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A fishing rod holding system, comprising:

a base plate;

a plurality of rails attached to the base plate, each of the plurality of rails comprising a plurality of connection points;

a plurality of pivot arms, each pivot arm configured to be detachably coupled to at least one of the plurality of rails at a first connection point of the plurality of connection points;

a plurality of rod holders, each rod holder rotatably coupled to a corresponding pivot arm of the plurality of pivot arms and configured to be detachably and rotatably coupled to at least one of the plurality of rails at a second connection point of the plurality of connection points, wherein an angular orientation of a rod holder of the plurality of rod holders is configured to be adjusted by uncoupling the rod holder or a corresponding pivot arm of the plurality of pivot arms from at least one of the plurality rails and coupling the rod holder or the corresponding pivot arm of the plurality arms to at least one of the plurality rails at a third connection point.

2. The system of claim 1, wherein the angular orientation of the rod holder is configured to be adjusted between a first and second angular orientation.

3. The system of claim 2, wherein the first angular orientation is an orientation where the rod holder is substantially parallel to the base plate.

4. The system of claim 2, wherein the second angular orientation is an orientation where the rod holder is substantially normal to the base plate.

5. The system of claim 1, wherein the base plate is configured to be mounted onto an external surface or object.

6. The system of claim 1, further comprising a vehicle, wherein the base plate is configured to be secured onto a surface of a vehicle.

7. The system of claim 1, wherein each pivot arm of the plurality of pivot arms is detachably coupled to each rod holder of the plurality of rod holders.

8. The system of claim 1, wherein a rod holder of the plurality of rod holders is configured to be coupled to the least one of the plurality of rails at the second connection point by inserting a mechanical connector through a rail connection point of the rod holder and the second connection point.

9. The system of claim 8, wherein the mechanical connector comprises a screw, a bolt and nut, or a pin.

10. A method for storing fishing rods or other items, the method comprising:

providing a fishing rod holding system, the fishing rod holding system comprising:

a base plate;

a plurality of rails attached to the base plate, each of the plurality of rails comprising a plurality of connection points;

a plurality of rod holders, each of the plurality of rod holders configured to be rotatably coupled to at least one of the plurality of rails at a first connection point; and a plurality of pivot arms, each of the plurality of pivot arms rotatably attached to at least one of the plurality of rod holders, each pivot arm configured to be coupled to at least one of the plurality of rails at a second connection point;

coupling a rod holder of the plurality of rod holders to a rail of the plurality of rails at the first connection point;

coupling a pivot arm of the plurality of pivot arms to the rail at a second connection point; and engaging a fishing rod with the at least one rod holder, thereby securing the fishing rod to the fishing rod holding system.

11. The method of claim 10, further comprising altering an angular orientation of the rod holder.

12. The method of claim 11, wherein altering the angular orientation of the rod holder comprises:

detaching the pivot arm from the rail at the second connection point; and reattaching the pivot arm to the rail at a third connection point.

13. The method of claim 11, wherein altering the angular orientation of the rod holder comprises:

detaching the rod holder from the rail at the first connection point; and reattaching the rod holder to the rail at a third connection point.

14. The method of claim 11, wherein altering the angular orientation of the rod holder comprises changing the angular orientation of the rod holder between 0° and 90°.

15. The method of claim 10, further comprising mounting the base plate onto an external surface or object.

16. The method of claim 10, further comprising securing the base plate to a surface of a vehicle.

17. The method of claim 10, wherein coupling the rod holder to the rail at the first connection point, comprises:

aligning the first connection point with a rail connection point of the rod holder; and inserting a mechanical connector through the first connection point and the rail connection point.

18. The method of claim 17, wherein the mechanical connector comprises a screw, a bolt and nut, or a pin.

* * * * *